(12) United States Patent
Ouellette

(10) Patent No.: US 8,801,001 B2
(45) Date of Patent: Aug. 12, 2014

(54) WHEEL-UNIT-READY SKI FOR SKI-MOUNTED VEHICLE

(71) Applicant: Retrax, Caribou, ME (US)

(72) Inventor: Michael J. Ouellette, Caribou, ME (US)

(*) Notice: Subject to any disclaimer, the term of this patent is extended or adjusted under 35 U.S.C. 154(b) by 0 days.

(21) Appl. No.: 14/069,515

(22) Filed: Nov. 1, 2013

(65) Prior Publication Data

US 2014/0054868 A1 Feb. 27, 2014

Related U.S. Application Data

(63) Continuation-in-part of application No. PCT/US2012/049123, filed on Aug. 1, 2012.

(60) Provisional application No. 61/514,357, filed on Aug. 2, 2011.

(51) Int. Cl.
*B62K 13/00* (2006.01)

(52) U.S. Cl.
USPC .......................................... 280/7.12; 280/9

(58) Field of Classification Search
USPC .................. 180/182; 280/7.12, 9, 11, 809
See application file for complete search history.

(56) References Cited

U.S. PATENT DOCUMENTS

| | | | | |
|---|---|---|---|---|
| 3,218,006 A | * | 11/1965 | Albright | 244/50 |
| 3,726,354 A | * | 4/1973 | LaPlante | 280/21.1 |
| 4,026,502 A | * | 5/1977 | Masclet | 244/108 |
| 4,390,151 A | * | 6/1983 | Schneider | 244/108 |
| 6,823,957 B2 | * | 11/2004 | Girouard et al. | 180/190 |
| 6,932,359 B2 | | 8/2005 | Ouellette | |
| 7,316,284 B2 | * | 1/2008 | Lefort | 180/190 |
| 7,464,943 B1 | * | 12/2008 | Poggioli et al. | 280/9 |
| 2002/0074752 A1 | | 6/2002 | Noble | |
| 2005/0072613 A1 | * | 4/2005 | Maltais et al. | 180/182 |

* cited by examiner

*Primary Examiner* — John Walters
*Assistant Examiner* — James Triggs
(74) *Attorney, Agent, or Firm* — Patricia M. Mathers

(57) ABSTRACT

A snowmobile ski adapted to accommodate wheel units that are movable between a deployed position and a stowed position. The floor of the ski has one or more wheel openings to allow wheels to drop down to the deployed position. A wheel unit may have a single wheel or two wheels in tandem. The wheel units may be mounted on the kingpin, the side wall, inner ribs, or on the steering spindle.

36 Claims, 22 Drawing Sheets

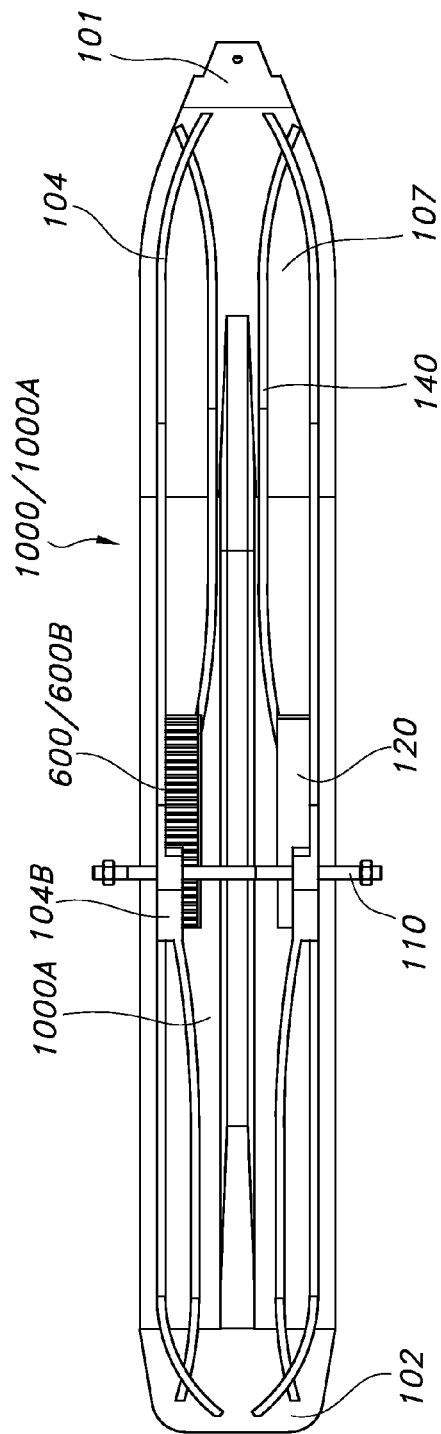
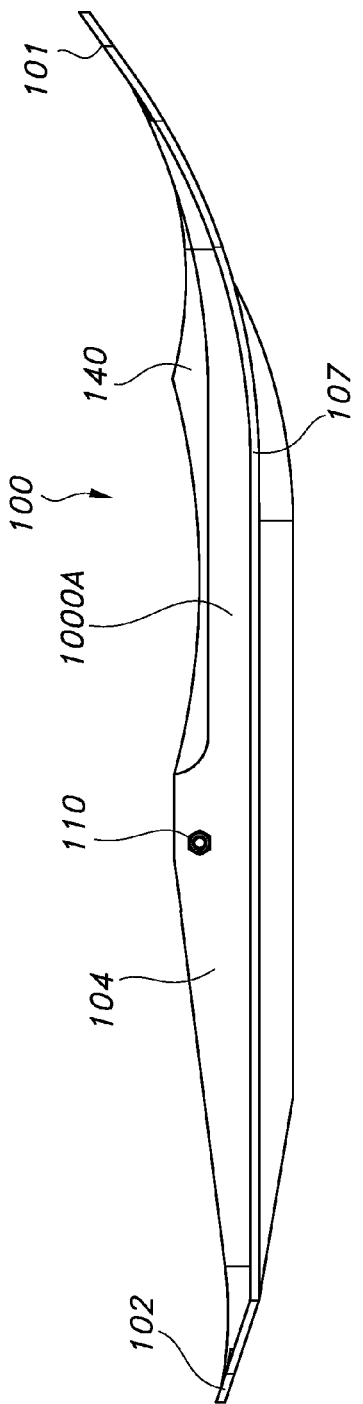

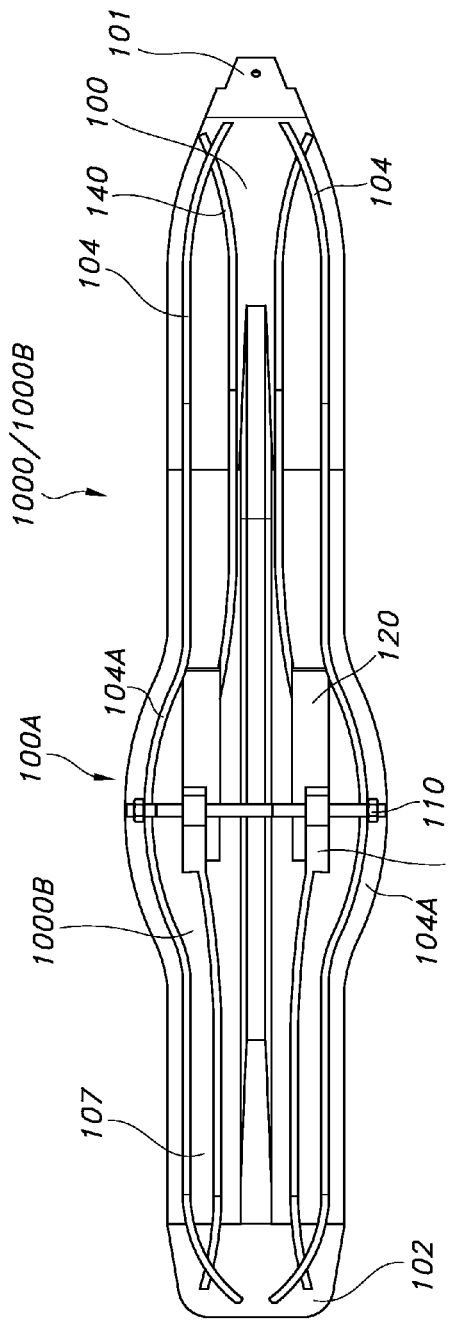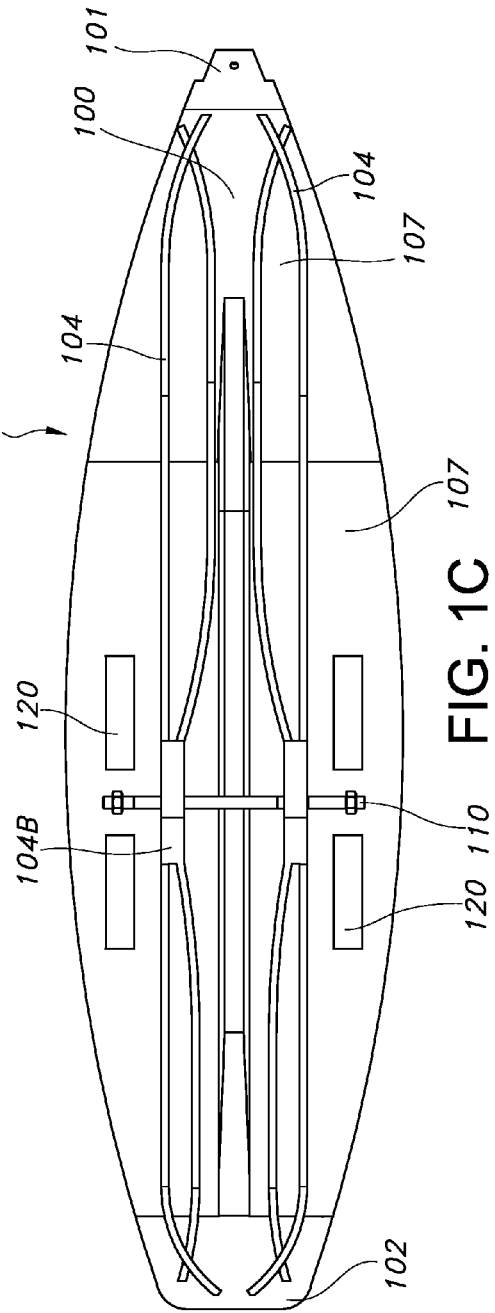
FIG. 1B
FIG. 1C

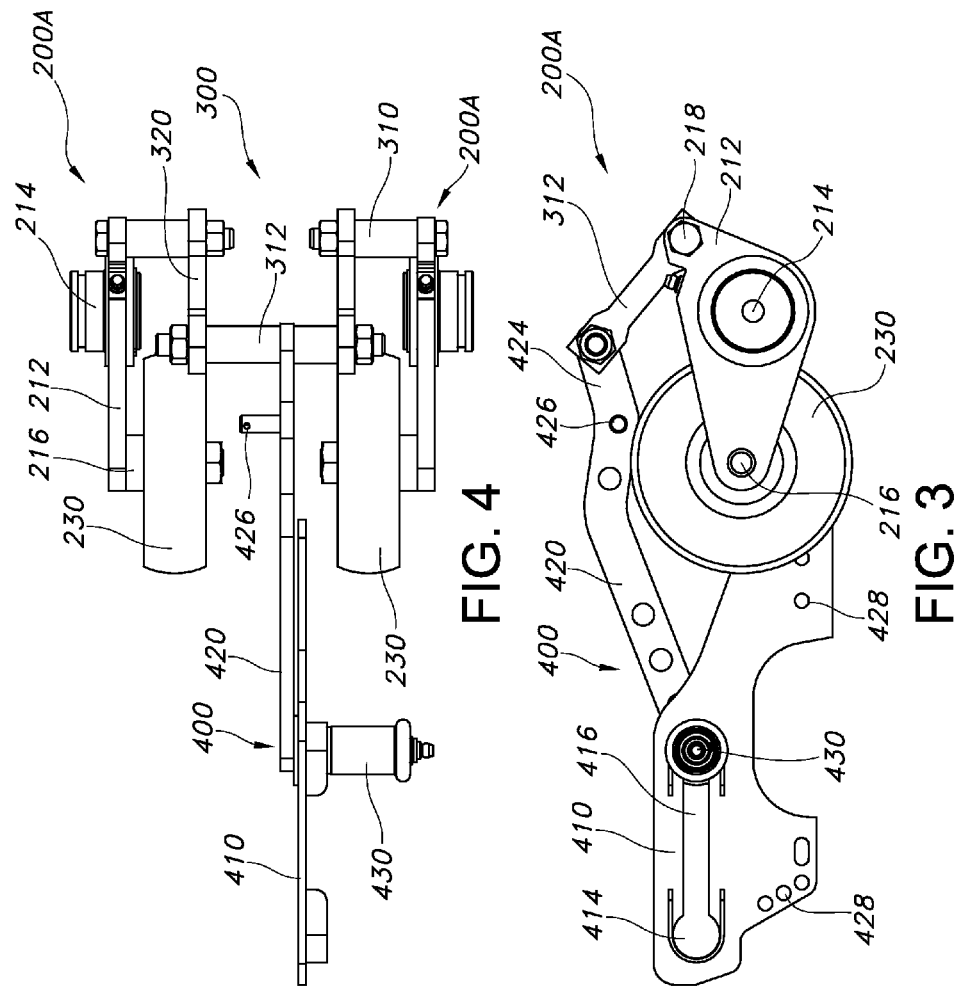

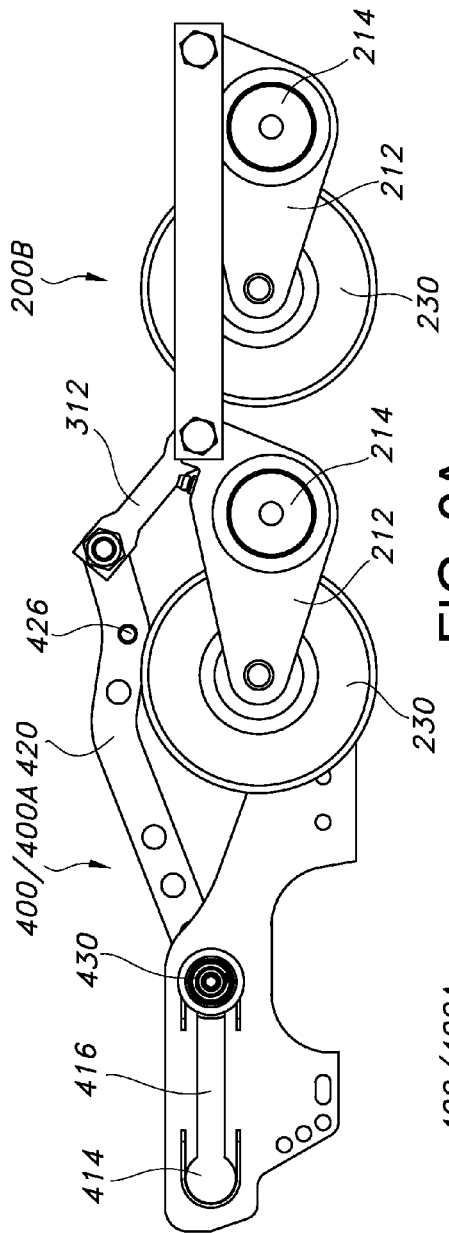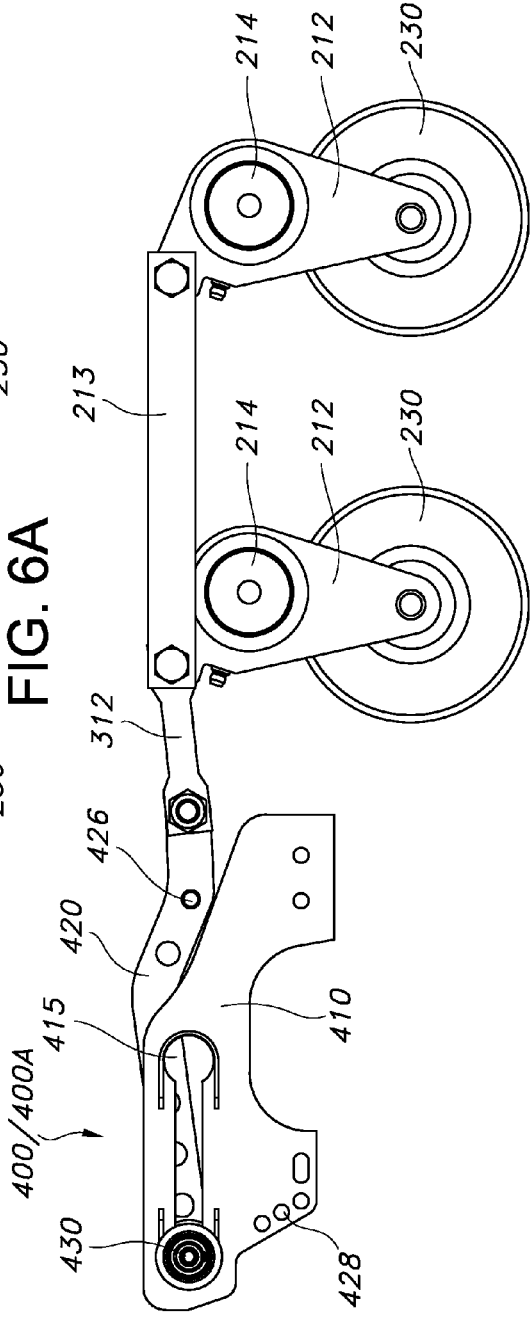
FIG. 6A
FIG. 6B

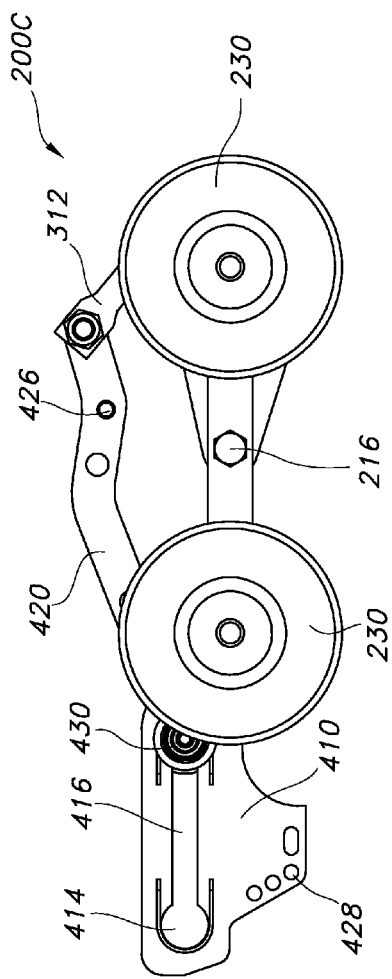
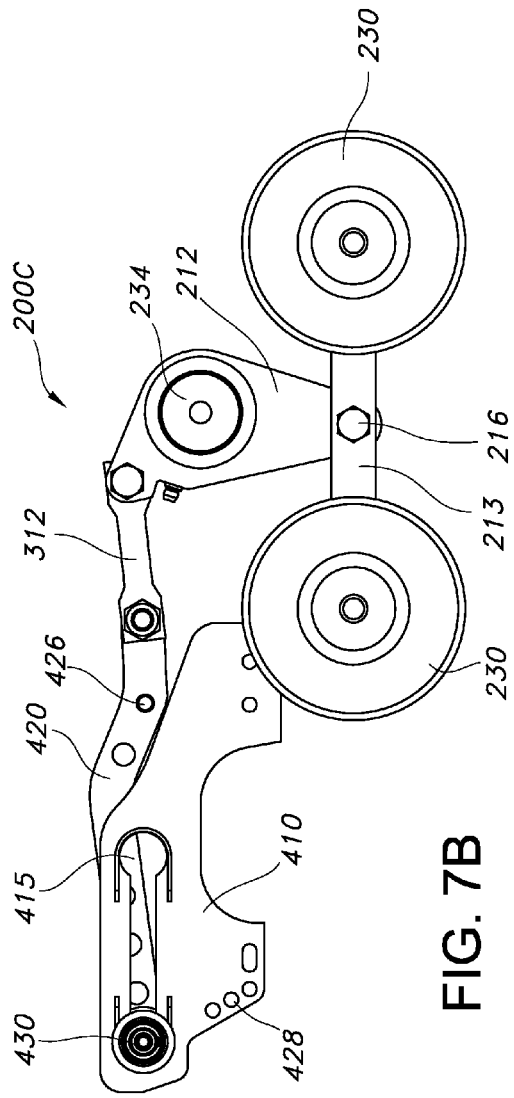
FIG. 7A
FIG. 7B

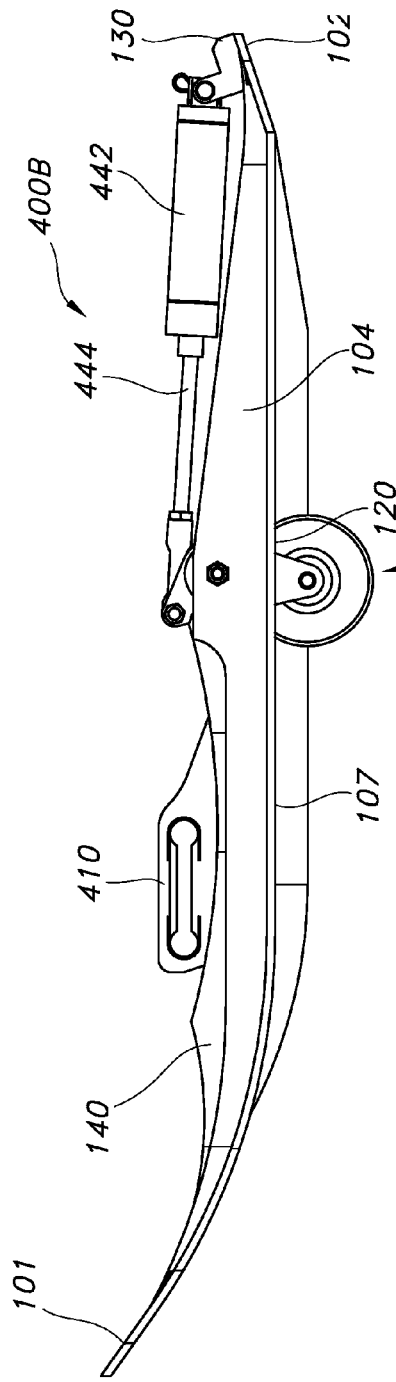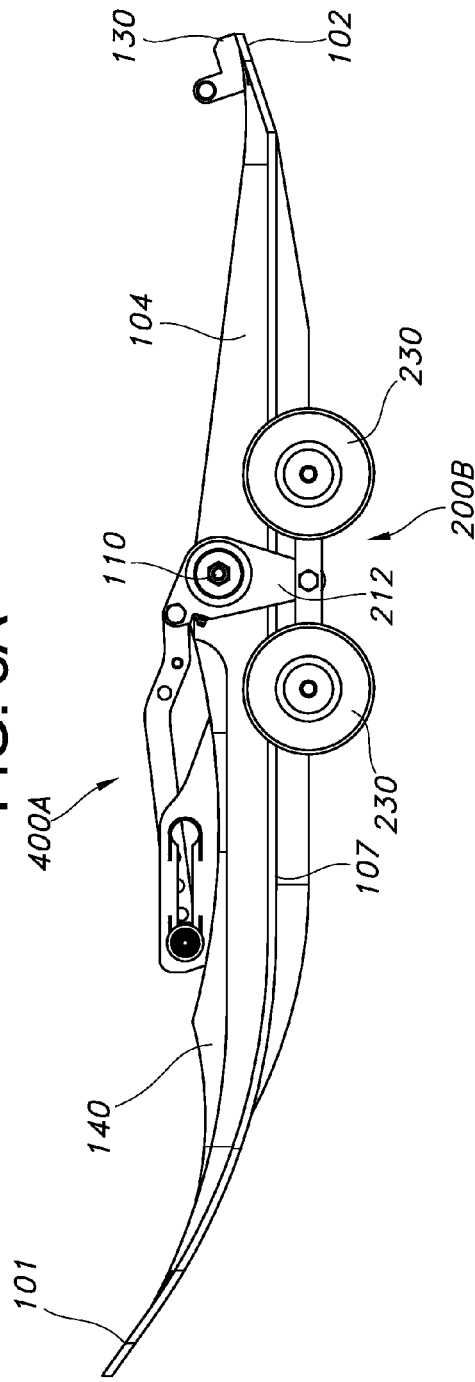

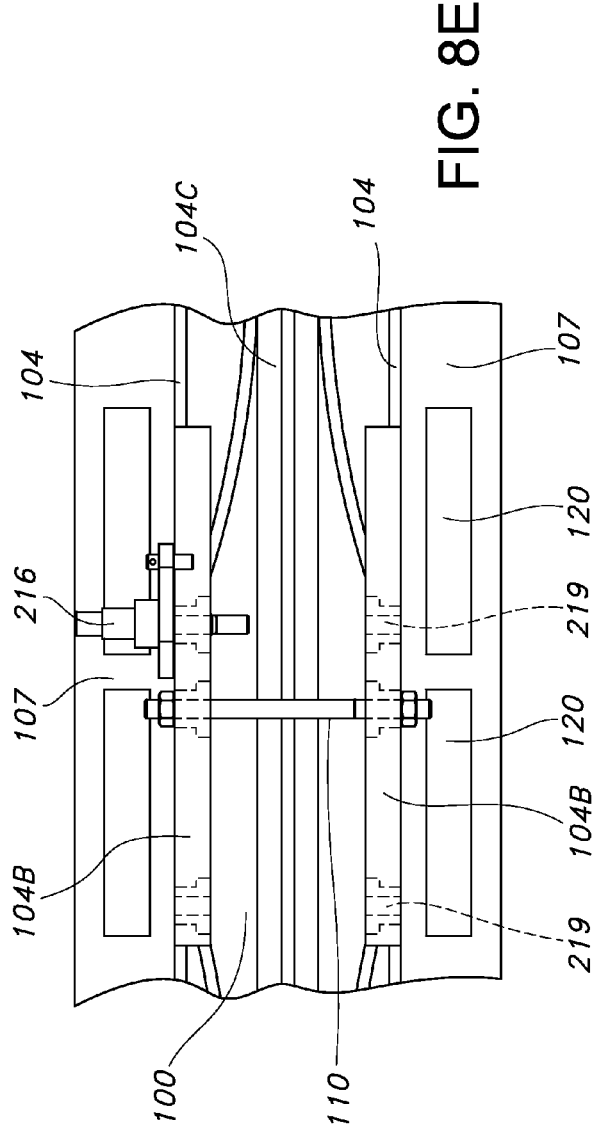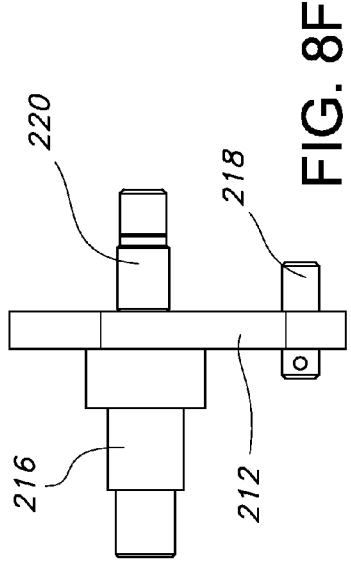

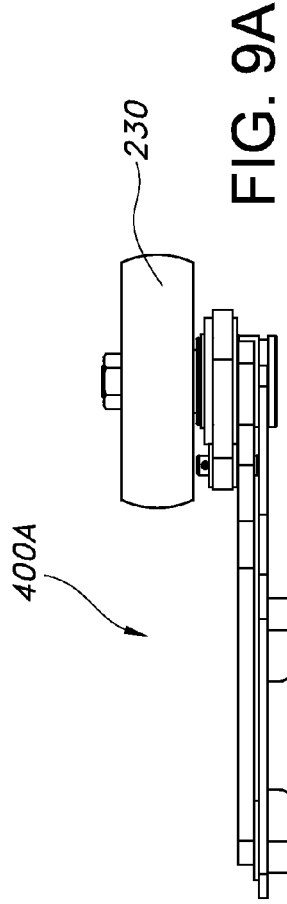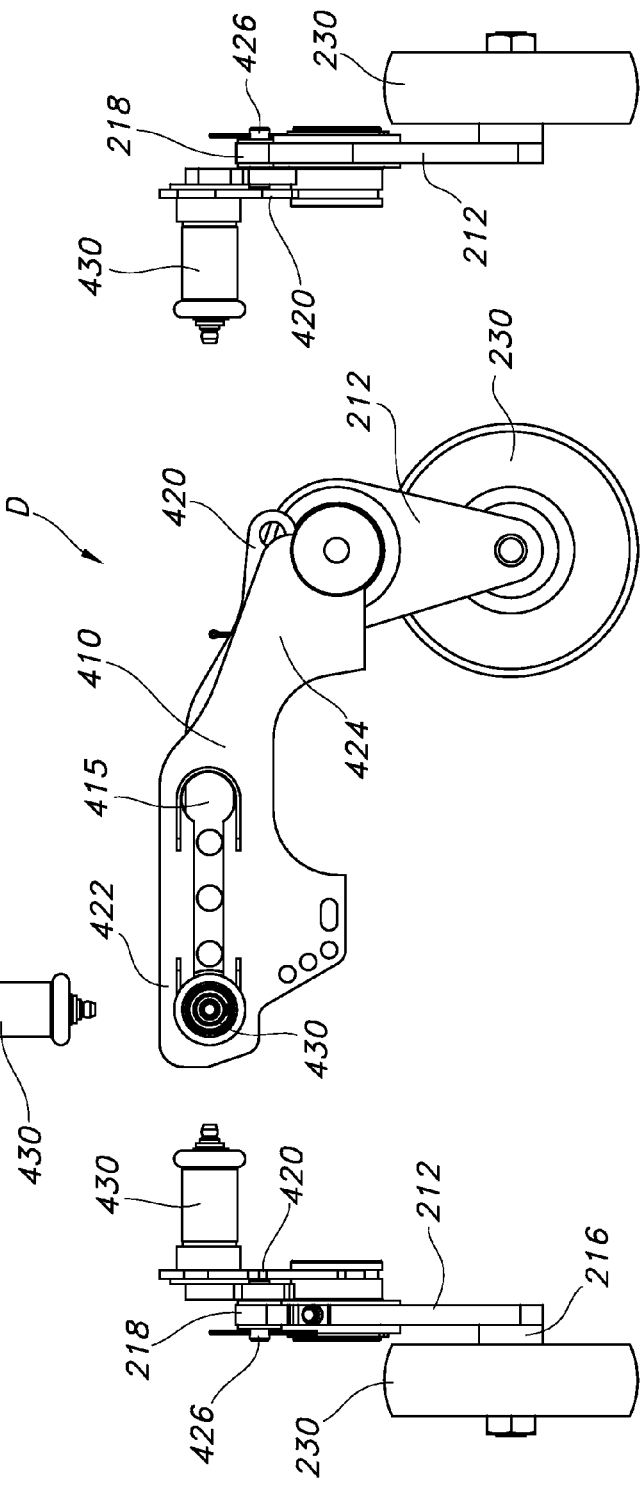

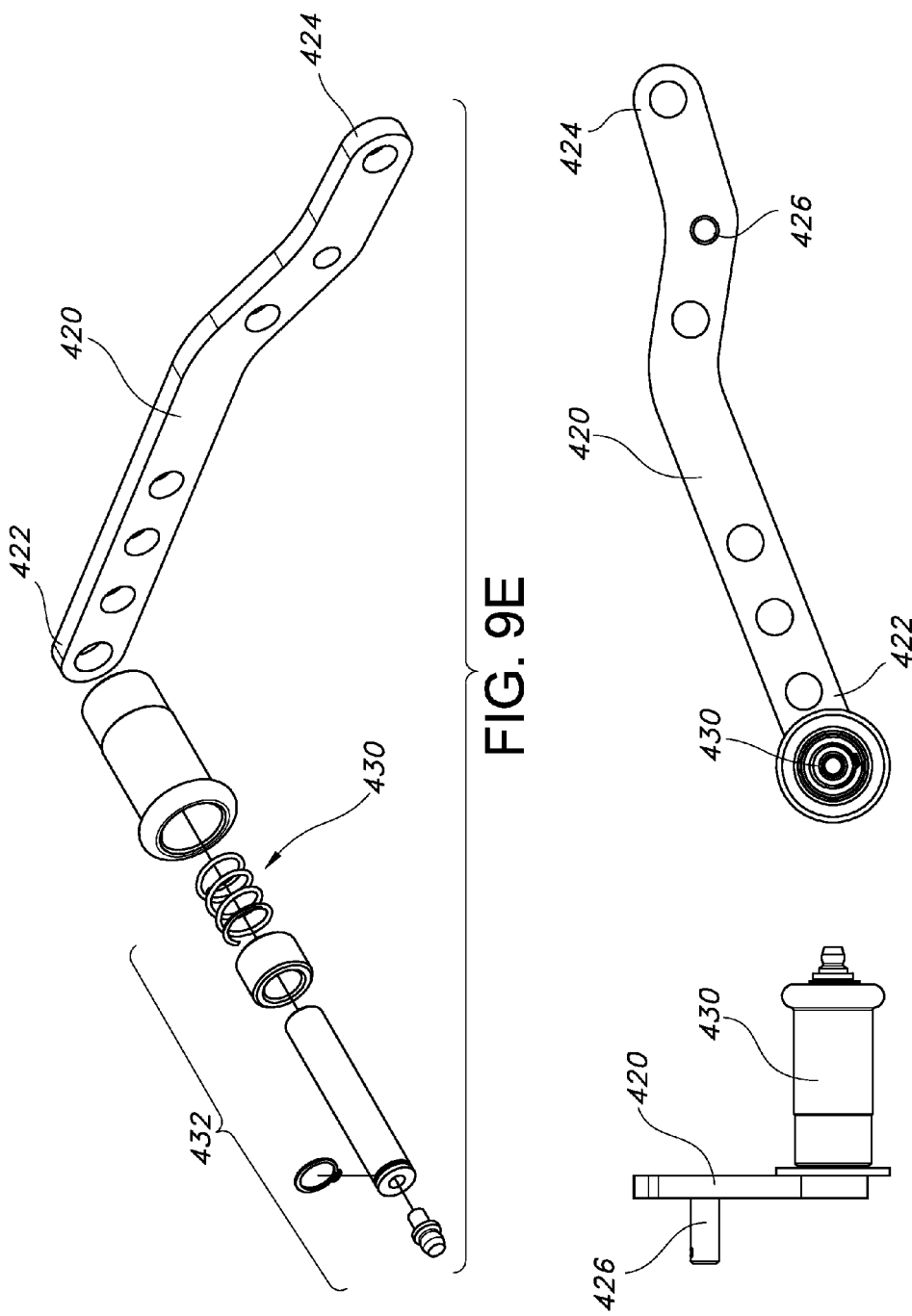

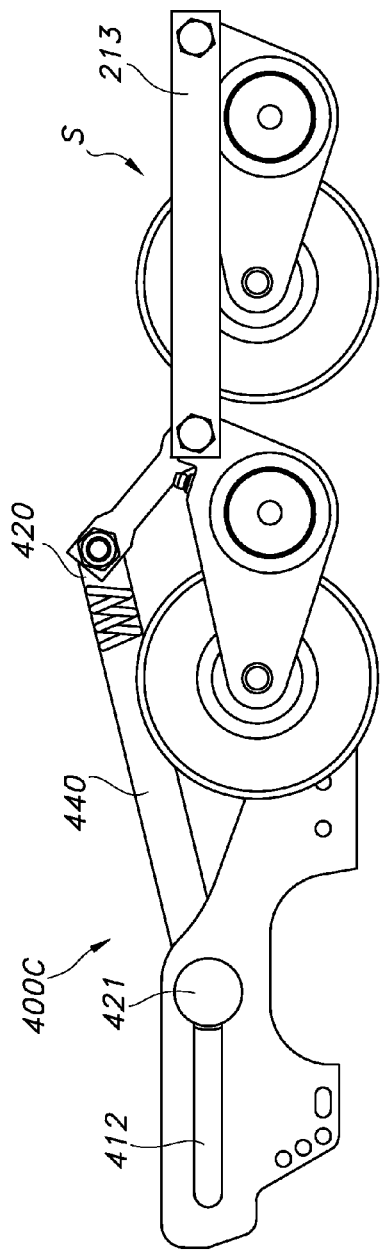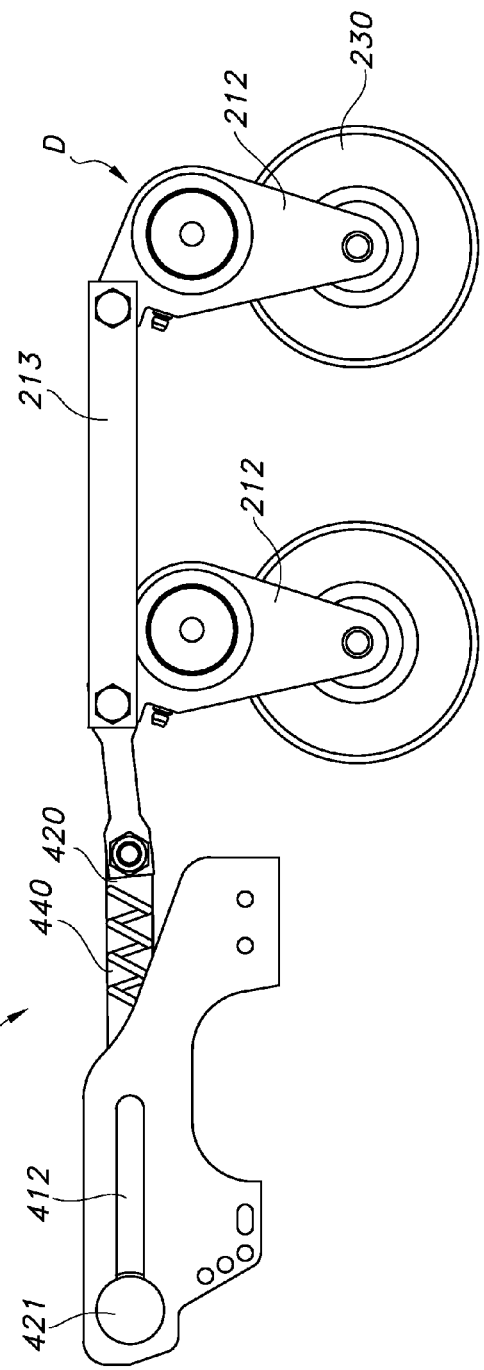
FIG. 11A
FIG. 11B

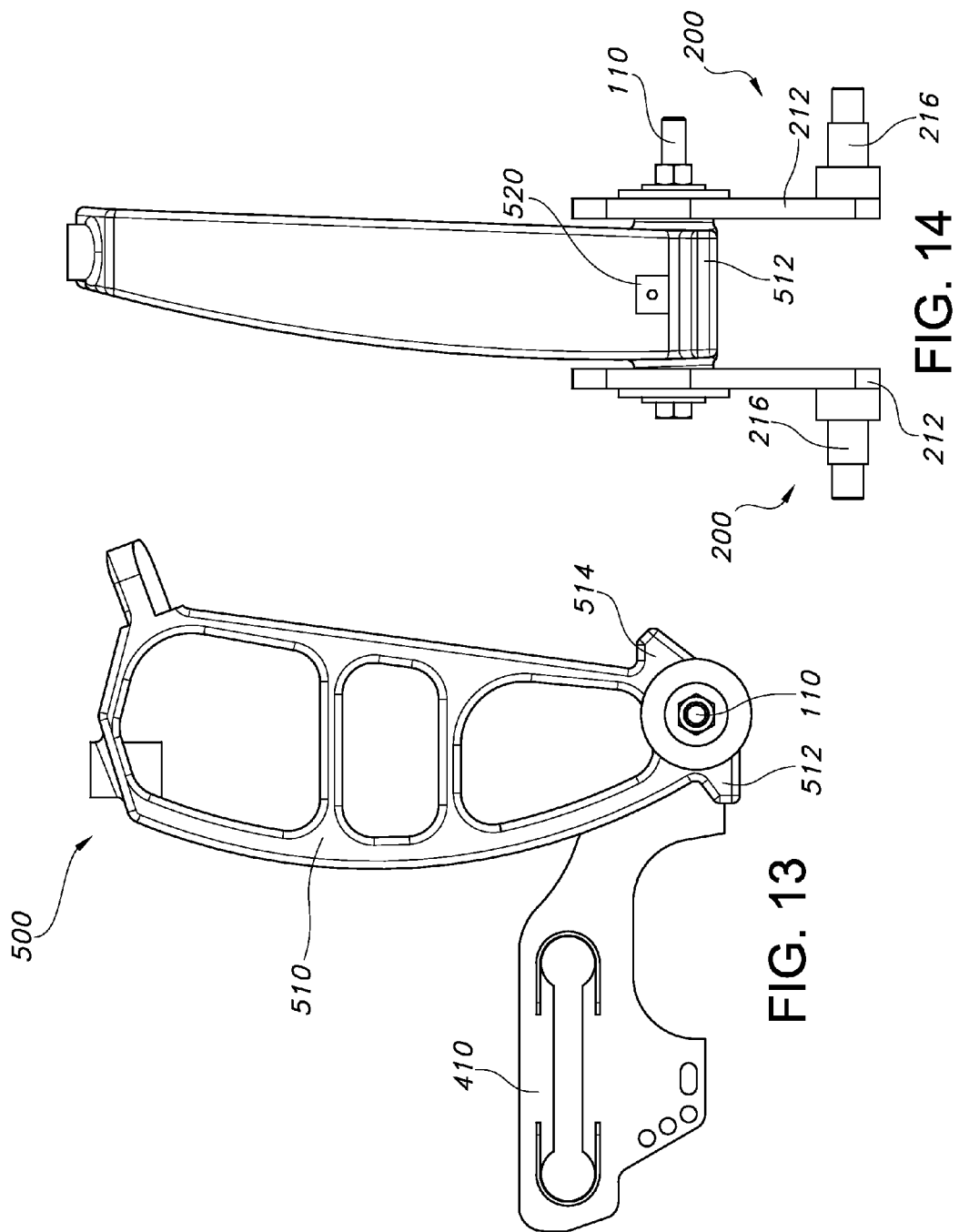

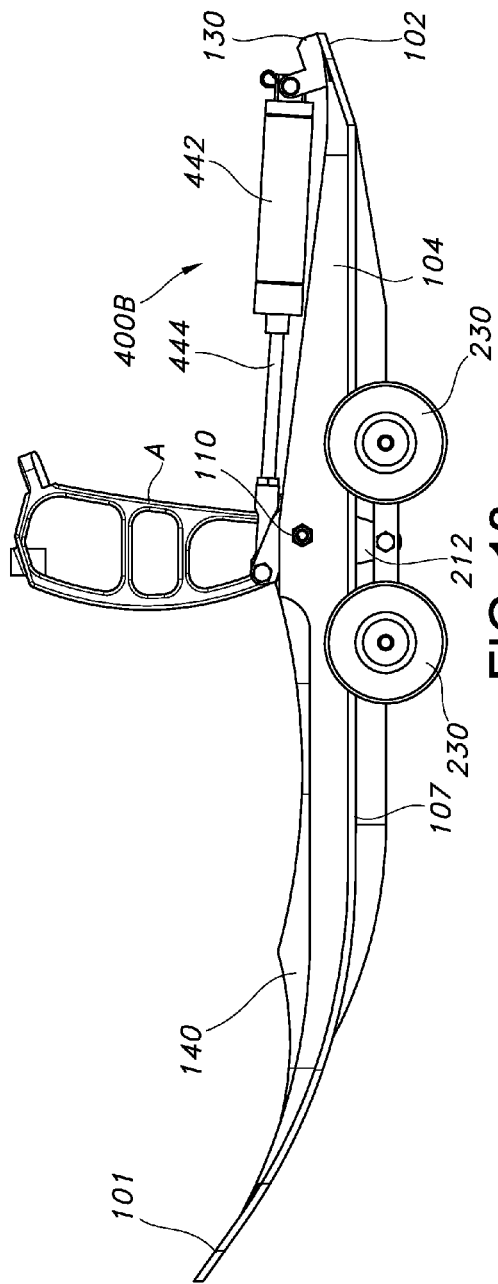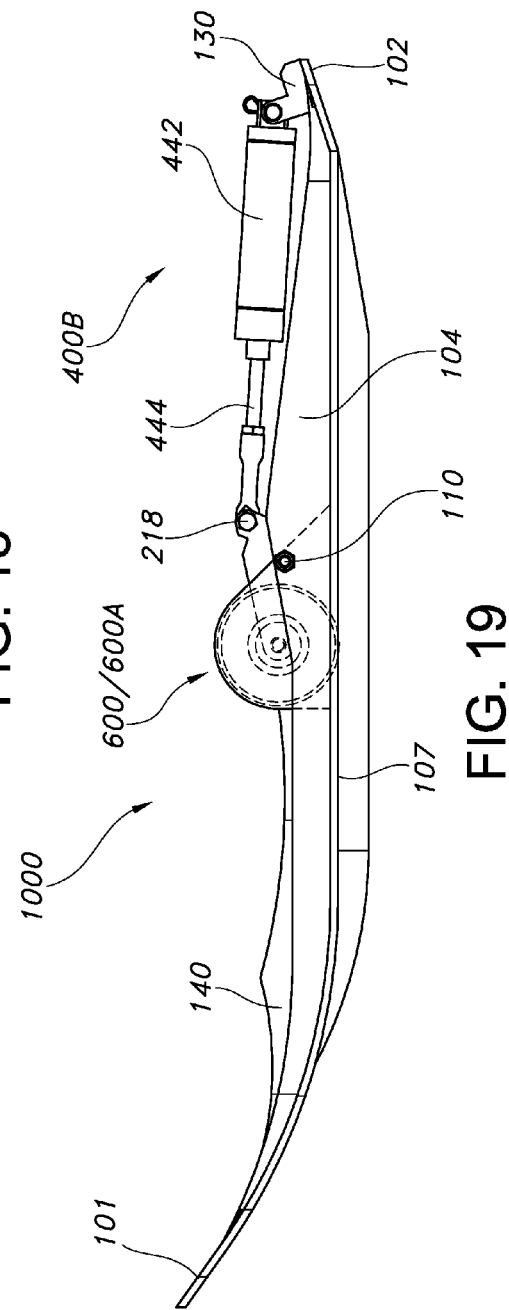

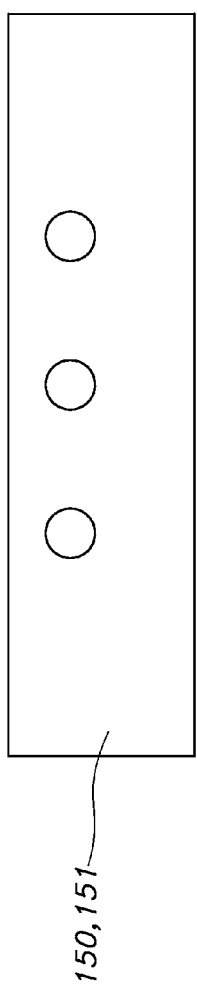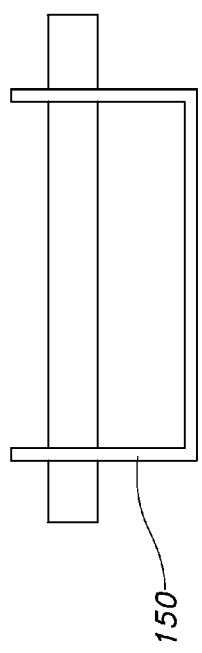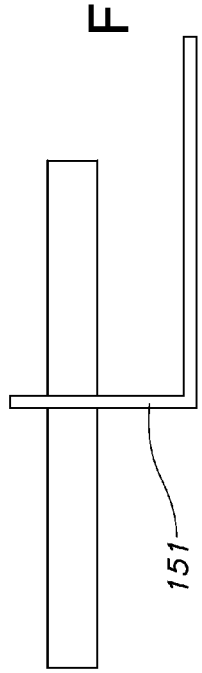

WHEEL-UNIT-READY SKI FOR SKI-MOUNTED VEHICLE

BACKGROUND INFORMATION

1. Field of the Invention

The invention relates to the field of snowmobiles. More particularly, the invention relates to skis for snowmobiles or other ski-mounted vehicles, with selectively deployable wheel units.

2. Description of the Prior Art

Snowmobiles are vehicles that are constructed to travel across snow and ice. As is generally known, the snowmobile is driven by an endless drive track arranged at the rear end of the underside of the snowmobile. The front end of the snowmobile is supported on two skis, which glide across the surface of the snow or ice. The skis typically have a carbide runner that runs along a portion of the bottom surfaces, to help keep the snowmobile traveling along a smooth track.

A disadvantage of snowmobiles is that the skis don't readily glide across gravel, hardtop, or other non-snow surfaces. It is difficult, if not impossible, to maneuver a snowmobile across a roadway, driveway, onto a ferry, etc., because the skis do not respond properly to steering operations initiated at the handlebars. Quite often, the snowmobile needs to be dragged or pushed on driveways and across roadways, etc. Furthermore, driving or dragging a snowmobile across a non-snow surface causes excessive wear on the carbide runners, which then need to be replaced.

In recent years, the sport of snowmobiling has evolved from one of traveling relatively short distances over trails close to home to one of weekend-long or longer cross-country trips. Previously, for example, a snowmobile operator would fill the gasoline tank of the snowmobile in his or her backyard, transport the snowmobile to a trail site or depart directly from the backyard for an afternoon or day of travel over snowmobile club trails, and then return home. Nowadays, people are traveling great distances across country on snowmobiles that involve two- or three-day tours or even such mammoth tours as from Alaska to Maine. Thus, where in the past the tank on the snowmobile was filled at home or at the point of departure before a daylong excursion, snowmobiles now need to be refilled while out traveling. This means that the snowmobile must be driven to a service station, typically by traveling some distance along a surface other than snow or ice, for example, along an asphalt road or gravel road. Also, it is not guaranteed for such lengthy trips that snow will always be available as a travel surface and, consequently, snowmobiles more and more frequently need to travel some distance across asphalt or gravel surfaces. When a snowmobile needs to be dragged or pushed only a short distance across a roadway or driveway, or up a ramp onto a ferry or trailer, it is possible for a person to do it alone or with the assistance of a traveling companion. Now, however, with the need to travel several miles along a roadway to get to a filling station, the inability to steer a snowmobile has become a major obstacle in the logistics and the enjoyment of the sport.

Efforts to make snowmobiles mobile on gravel or other surfaces have been undertaken over the years. Prior art includes conversion kits to replace the skis with wheels. These conversion kits were intended to replace the skis on a semi-permanent basis, that is, to convert a snowmobile into a wheeled vehicle for an extended period of time. Such conversion kits typically require that the ski be removed in order to mount the wheels, or, if the ski does remain attached to the vehicle, a longer kingpin must be used to mount the wheels. Thus, each time the wheels are mounted or removed, the kingpin must be replaced with the longer or shorter one, respectively. Both methods of converting the snowmobile to a wheeled vehicle involve a fair amount of work. Thus, such conversion kits are not generally an acceptable solution to the problem of having to change in relatively quick succession back and forth between a vehicle that rides on skis and one that rides on wheels, as happens when traveling over gravel or hardtop to fill the gas tank or to load onto a ferry or trailer.

The inventor of the present invention is also the inventor of several patents for wheel units for snowmobiles, all of which are incorporated herein in their entirety by reference: U.S. Pat. No. 6,527,282, issued 4 Mar. 2003; U.S. Pat. No. 6,824,147, issued 30 Nov. 2005; and U.S. Pat. No. 6,932,359, issued 23 Aug. 2005. In the meantime, innovation and development has also continued on the snowmobiles themselves. Today, modern snowmobiles have many more comforts and features than earlier models, and because of that, are also much heavier, and, in some cases, have become so heavy that more rugged and robust wheel units are needed.

What is needed therefore is simple and effective method of equipping a snowmobile with a wheel unit.

BRIEF SUMMARY OF THE INVENTION

The invention is a system of modular assemblies related to mounting and operating a wheel unit on a ski, whereby the ski is adapted to receive the modular assemblies. The inventive ski is referred to hereinafter as the "wheel-unit ready ski." By "modular assembly" is meant an assembly that may be mounted in or on a ski, either as an after-market add-on or by the manufacturer as a purchase option. Examples of the modular assemblies are various types of wheel units and various types of wheel-unit deployment assemblies, which may be mounted on the kingpin or a side wall of the wheel-unit ready ski or on a steering spindle that couples to the kingpin. The wheel units include single-wheel units and tandem-wheel units, and the deployment means include manual, semi-automated, and automated deployment means.

The inventive concept allows the purchaser or operator of a snowmobile or other type of vehicle with skis to choose among various wheel-unit options. Reference may be made hereinafter to a "snowmobile ski," because that is the most common type of vehicle with skis, but it is understood, that other types of vehicles, such as recreational vehicles, may be equipped with skis and skis with wheel units and such skis and wheel units are included in the scope of the invention.

The wheel-unit ready ski according to the invention is a molded component that has certain conventional structural elements, such as side walls, a portion of which are reinforced to support a boss for holding and supporting a kingpin and kingpin bushing, inner ribs, and a bottom glide surface. Other than that, the wheel-unit ready ski is not limited to any particular configuration with regard to placement of runners, carbides, etc. The wheel-unit ready ski is constructed so as to be able to receive the modular assemblies. For example, the inner ribs may have pre-drilled bores and/or brackets for mounting the modular assemblies, thus eliminating the work of measuring, aligning, and drilling holes later on for mounting the assemblies. Certain mounting elements for the modular assemblies may be integrated into the mold of the ski, so that the ski is adapted to receive a wheel unit and a deployment means, without having to modify the molded wheel-unit ready ski. The ski may be molded from a variety of materials, such as, but not limited to, plastic, a metal or metal alloy, carbon fiber, etc., and may be a saddled or saddleless ski, the saddle being a metal U-shaped or L-shaped channel that is provided in a central portion of the ski, between the ribs.

A snowmobile ski is a construction that is carefully balanced about an axis provided by the kingpin. This kingpin axis, also referred to hereinafter as the balance point, provides the ideal mounting point for a wheel unit. For this reason, in one embodiment of the invention, one or two wheel unit assemblies are mounted on or about the kingpin. The wheel or wheels of the wheel unit may extend beyond the body of the wheel-unit ready ski, i.e., be outside-mounted wheels. There are a number of reasons, however, that make it desirable to have the wheels mounted within the side walls of the wheel-unit ready ski. An inside mounting reduces the likelihood that the wheels will hit rocks or stumps, eliminates snow spray up onto the snowmobile rider or operator, and reduces stress on the kingpin. The wheel-unit ready ski according to the invention is a pre-molded ski body with one or more wheel openings for allowing the wheels to drop down or to be pulled up from the rolling surface. Also, a mounting means or bracket may be incorporated into the molded ski, to allow a manual or an automated deployment means to be easily fitted to the ski and the selected wheel unit.

A second embodiment of the invention includes the wheel-unit ready ski described above with the wheel unit mounted on the snowmobile steering spindle. The conventional snowmobile steering spindle may be used as is or may be adapted to accommodate a particular configuration of wheel unit and deployment means. The snowmobile steering spindle is mounted on the A-arms or stabilizing arms of the snowmobile and movably coupled with the kingpin. This spindle body has a boss on each side with a through-bore extending through the bosses for receiving the kingpin. Typically, a kingpin bushing extends through the two through-bores and the bosses. The kingpin is inserted through the bushing of the spindle and through the side walls of the ski. The spindle bosses themselves or the kingpin bushing provide another suitable location for mounting the modular wheel unit assemblies, because these elements, too, are balanced about the kingpin. Thus, a wheel unit mounted on the spindle bosses or bushing is also mounted indirectly on the kingpin. The steering spindle is conventionally cast from metal. Ideally, a steering spindle according to the invention has integrated into the casting a bracket or handle for coupling the spindle with a deployment means for the wheel unit.

In addition to the modular assemblies mentioned above, the wheel-unit ready ski according to the invention may also have additional features, such as a fender for outside mounted wheel units or a snow guard for inside mounted wheel units, to prevent snow from flying up through the wheel openings.

BRIEF DESCRIPTION OF THE DRAWINGS

The present invention is described with reference to the accompanying drawings. In the drawings, like reference numbers indicate identical or functionally similar elements. The drawings are not drawn to scale.

FIG. 1A is a top plan view of the first embodiment of the wheel-unit ready ski according to the invention, showing wheel openings in the floor of the ski, inside the side wall.

FIG. 1B is a top plane view of the second embodiment of the wheel-unit ready ski according to the invention, showing a bulge in the side wall in the area of the kingpin.

FIG. 1C is a top plan view of the third embodiment of the wheel-unit ready ski according to the invention, showing a widened area outside of the side wall, with wheel openings in the widened area, for an outside mount.

FIG. 2 is a side elevation view of the ski of FIG. 1A.

FIG. 3 is a side elevation view of two wheel units ganged together by a coupling assembly that is coupled to a manual deployment means.

FIG. 4 is a top plan view of the wheel units and coupling assembly of FIG. 3.

FIG. 6A illustrates the first tandem-wheel unit with the wheels moved to the stowed state, each wheel mounted on a separate cam plate.

FIG. 6B illustrates the first tandem-wheel unit of FIG. 6A, with the wheels moved to the deployed state.

FIG. 7A illustrates a second embodiment of the tandem-wheel unit, with the wheels moved to the stowed state, the two wheel units ganged together and coupled to a single cam plate.

FIG. 7B is an illustration of the tandem-wheel unit of FIG. 7A, moved to the deployed state.

FIG. 8A an inside-mounted single-wheel wheel unit, with the wheel deployed through a wheel opening in the ski floor.

FIG. 8B shows an outside-mounted tandem-wheel unit, with a single cam plate mounted on the kingpin and the two wheels coupled together.

FIG. 8E illustrates a side wall with bushings for mounting one or more wheel units.

FIG. 8F shows a cam plate with a stub shaft for mounting a wheel unit in one of the bushings.

FIG. 9A is a top plan view of the manual deployment means of FIG. 12.

FIG. 9B is a side elevation view of the manual deployment means

FIG. 9C is a front elevation view of the manual deployment means.

FIG. 9D is a rear elevation view of the manual deployment means.

FIG. 9E is an exploded view of the actuating lever with the locking handle.

FIG. 9F is a front elevational view of the actuating lever.

FIG. 9G is a side elevational view of the actuation lever.

FIG. 11A is a side elevation view of the semi-automatically actuated deployment means, with the wheel unit in the stowed position.

FIG. 11B is a side elevation view of the semi-automatically actuated deployment means, with the wheel unit in the deployed position.

FIG. 13 is a side elevation view of the steering spindle according to the invention, showing a deployment means guide extending from a lower end of the spindle.

FIG. 14 is a rear view of the steering spindle according to the invention, showing a bracket for coupling the steering spindle with the deployment means and wheel units mounted on the spindle boss.

FIG. 18 illustrates the piston connected to the cam plate.

FIG. 19 illustrates a fender on the wheel-unit ready ski.

FIG. 21 illustrates through-bores in a saddle for mounting a wheel unit and receiving the kingpin.

FIG. 22A is a schematic illustration, showing the cross-section of a full saddle with a kingpin passing through the through-bores.

FIG. 22B is a schematic illustration, showing the cross-section of a half-saddle with a kingpin passing through a through-bore.

FIG. 22B illustrates through-bores in the half-saddle for mounting a wheel unit and for the kingpin.

DETAILED DESCRIPTION OF THE INVENTION

Figure 1D:
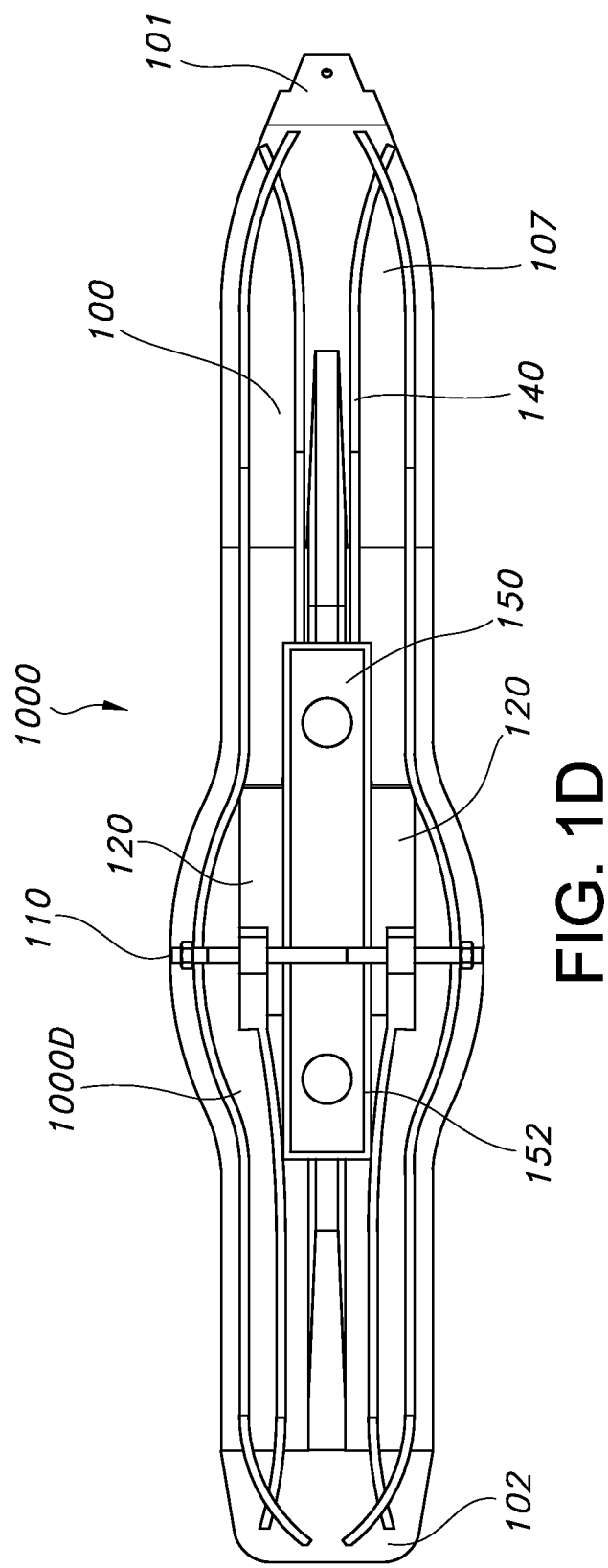
FIG. 1D is a top plan view of the fourth embodiment of the wheel-unit ready ski according to the invention, showing a saddle and wheel openings for an inside mount.

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

FIGS. 1A-1D illustrate various embodiments of a wheel-unit ready ski 1000 according to the invention, adapted to receive a wheel unit 200 and a deployment means 400 that may be provided as modular assemblies that are assembled on the ski post purchase or are incorporated into a ready-to-sell ski. Various embodiments of the wheel unit 200 and deployment means 400 are shown in FIGS. 3-8F and FIGS. 9-11B, respectively, and will be discussed below. FIGS. 1A-1D show the wheel-unit ready ski as a saddleless ski, whereas, in FIG. 1D, the wheel-unit ready ski 1000 has a saddle or a shoe 150.

The terms 1000A-1000C shall designate specific embodiments of the wheel-unit ready ski 1000 and the term "wheel-unit ready ski 1000" shall refer in general to a ski that has elements common to the various embodiments of wheel units and deployment means. Reference is made to FIG. 1A and FIG. 2 to illustrate the basic features of the wheel-unit ready ski 1000.

FIG. 1A is a top plan view and FIG. 2 a side elevation view of the first embodiment 1000A of the wheel-unit ready ski 1000. The ski 1000 has a ski body 100 that is a molded, pressed, or stamped component. The ski body 100 has a leading end 101 and a trailing end 102, two side walls 104 extending upward from a ski floor 107, and a bottom surface that is the ski glide surface. Whenever reference is made hereinafter to "front" or "rear" views of the various components and assemblies, "front" refers to the view when facing the leading edge 101 and "rear" the view when facing the trailing edge 102. A kingpin 110 extends across the ski body 100 and is supported in through-bores in a reinforced section 104A of the two side walls 104. Not shown, but understood by those skilled in the art, a kingpin bushing is inserted in the through-bores and the kingpin 110 inserted through the bushing. The reinforced section 104A is dimensioned to accommodate the various wheel unit installations and, thus, may extend over a greater length than shown in the illustrations. In the saddleless skis 1000A-1000C, a pair of reinforcing ribs 140 are provided inside the side walls 104. The typical ski body also has two inner ribs that extend parallel to a centerline along the greater portion of the ski. These inner ribs may also be reinforced, as will be discussed in connection with FIG. 8E.

The wheel-unit ready ski 1000 has a wheel opening 120 in the ski floor 107 that is dimensioned to allow the wheel unit 200 to be deployed, i.e., to lower a wheel into contact with a road or floor surface. FIGS. 1A-1D show wheel openings 120 on both sides of the ski body 100. It is understood, however, that all of the wheel-unit ready skis 1000 may have a wheel opening 120 on one side only, depending on the type and intended use of the snowmobile.

FIG. 1A illustrates the first embodiment wheel-unit ready ski 1000A that is adapted to accommodate two single-wheel wheel units 200, one on each side of the ski. The wheel opening 120 is shown on one side as an uncovered opening and, on the other side, covered with a snow guard 600. This is for purposes of illustration only. If a wheel-unit ready ski 1000 according to the invention is equipped with the snow guard 600, all wheel openings 120 will likely be fitted with the snow guard. FIG. 1B shows the second embodiment of the wheel-unit ready ski 1000B that is similar in construction to that of the first embodiment, but which has a widened area 100A in the ski body 100. This widened area is a design choice that may be governed by the type of wheel unit the ski is intended to accommodate, or by aesthetics, etc. It is also understood that, instead of the widened area 100A that is constructed as a pronounced bulge, the floor 107 of the ski body 100 may be widened along a greater portion of the length of the ski. In other words, the outer contour of the ski body 100 may be gently curved to achieve the desired widened area 100A or may have a generally rectangular shape, as shown in FIG. 1A, but be wider along the length of the ski body. FIG. 1C illustrates the third embodiment of the wheel-unit ready ski 1000C, in which the wheel opening 120 is provided outside of the sidewall 104, but through the floor 107 of the ski body 100. The wheel-unit ready ski 1000A-1000C shown in the previous figures is a saddleless ski. FIG. 1D illustrates the wheel-unit ready ski 1000 that has a shoe or saddle 150. In the embodiment shown, the saddle is a full saddle that fits inside the sidewalls 104 and that is essentially an open metal channel with shallow sidewalls 152 that serve as the inner ribs 140 in the mid-section of the ski body 100. The kingpin 110 passes through the shallow sidewalls, as well as through the sidewalls 104 on the ski body 100. In the embodiment shown, the ski body has a widened area in the reinforced section, but it is understood that the ski may just as well have any shape that is suitable to accommodate the specific type of wheel unit. Instead of the full saddle 150, a half-saddle 151 may also be used. FIGS. 21-22B illustrate cross-sectional and side views of the full saddle 150 and the half-saddle 151.

All of the skis 1000A-1000D are constructed to receive the wheel unit 200 and the deployment means 400 as modular assemblies, in order to provide the vehicle owner with a number of options regarding installation of a wheel unit and a deployment means. FIGS. 3-7 illustrate various embodiments of the wheel unit 200, each one coupled with a manual deployment means 400A

FIG. 3 illustrates the basic components of a first wheel unit 200A that may be coupled to the kingpin, the wheel unit including a wheel 230 mounted on a cam plate 212. One of the reasons for using the kingpin 110 as a mount for a wheel unit is that the ski 1000 is balanced about the kingpin and it is, thus, the ideal position for mounting a wheel unit. A first position on the cam plate has a stub axle 216 for mounting a wheel 230, a second position a coupling means 218 for coupling the cam plate 212 to the deployment means 400 or, if two wheels 230 are to be yoked together, to a coupler 300, and a third position has a reinforced bore 214 for coupling the cam plate with the kingpin 110, or to a guide or mounting plate that is incorporated into or mounted on the wheel-unit ready ski 1000, or mounted on the side wall 104 of the wheel-unit ready ski. FIGS. 3 and 4 show the wheel 230 mounted to the inside of the cam plate 212. This configuration of the wheel unit 200A allows the unit to be fitted onto wheel-unit ready skis 1000 that have wheel openings 120 inside the side walls.

FIG. 4 also shows one example of a coupling linkage or assembly 300 that may be used to gang two wheel units together. In this case, two single-wheel units 200A are shown yoked together, with the wheels 230 mounted on the inside surface of the cam plates 212. The coupler 300 has a frame comprising a first link 310 that is coupled with a second link 320 and with a yoke 312. An actuating lever 420 of the deployment means 400 is coupled with the yoke 312. One end of the second link 320 is coupled to the coupling means 218 on the cam plate 212. Depending on the exact configuration of the wheel-unit ready ski 1000 and the coupler 300, bushings may be used to keep the actuating lever 420 properly centered on the coupling bar 312. It is understood, that any of the wheel units described hereafter may also be coupled together in this manner, regardless of how the wheel unit 200 is mounted on the wheel-unit ready ski 1000, whether on the kingpin, the side wall, or, as will be discussed later, on a snowmobile steering spindle. Furthermore, the wheels 230 may be mounted on the outside of the cam plate 212 for an outside mount.

Figure 5:
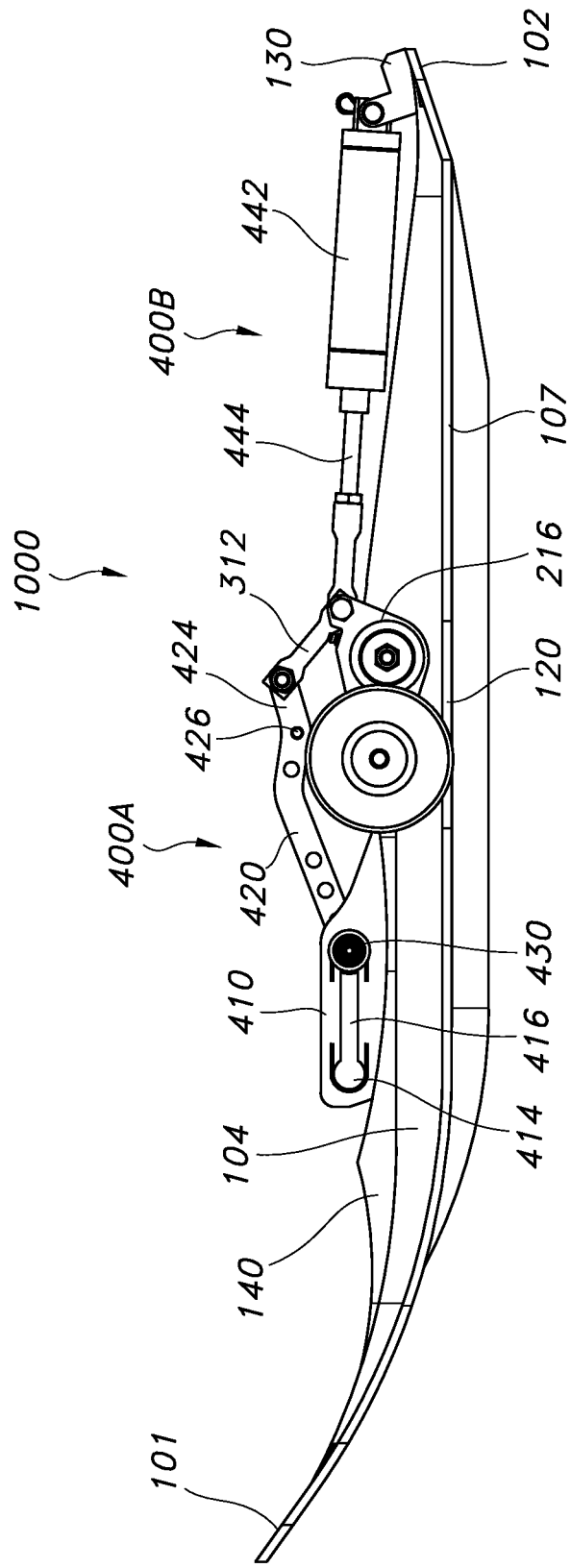
FIG. 5 illustrates the single-wheel unit outside mount, mounted on the kingpin, with means for assembling a manual deployment means and an automated deployment means on the ski.

FIG. 5 shows the wheel 230 mounted on the outside face of the cam plate 212 and the cam plate mounted on the outside of the side wall 104. In this configuration, the wheel 230 drops down into a wheel opening 120 that is provided on the area of the ski floor outside the side wall 104. Also illustrated is a ski 1000 that is adapted to receive a manual deployment means 400A or an automated deployment means 400B. Elements of these deployment means 400A and 400B are described below in detail. A deployment guide 410 and a bracket 130 are either integrated into or mounted on the molded ski body 100. With this wheel-unit ready ski 1000, the owner can choose to install either the manually operated deployment means 400A or the automated one 400B. Most snowmobile operators or owners will elect one type of deployment means 400, but some may choose to mount both types onto one ski, for example, when using the snowmobile in particularly harsh environments, to have a redundancy. FIG. 5 shows that a manual and an automated deployment means may be mounted at the same time on the wheel-unit ready ski 1000. The shift lever 420 on the manual system shown in this figure is adapted for use with the coupling link 312 on the coupling assembly 300 that is shown in FIGS. 3 and 4. If the wheel unit 200 is to be mounted on only one side of the ski 1000, the coupling mechanism 300 is eliminated and, when using the manually operated deployment means 400A, the second end 424 of the shift lever 420 couples directly to the coupling link 216 on the cam plate 212. When using the automated deployment means 400B, the cylinder 442 is coupled to the bracket 130 and the rod 440 to the coupling link 216.

FIGS. 6A-6B are side elevation views of a first tandem-wheel unit 200B, with each wheel 230 mounted on a separate cam plate 212 and the two cam plates 212 mounted on a rigid bar 213. For purposes of clarity, these figures illustrate details of the deployment means 400 and tandem-wheel unit without showing any features of the wheel-unit ready ski 1000. It is understood that the rigid bar 213 may be mounted on the kingpin 110 or on the side wall 104, either as an inside mount or an outside mount. A single deployment means 400 is coupled to the rigid bar 213, such that the deployment means moves both wheel units simultaneously between a stowed position, shown in FIG. 6A, and a deployed position, shown in FIG. 6B. In this embodiment, one of the cam plates 212 is mounted either on the kingpin 110 or on the side wall of the wheel-unit ready ski.

FIGS. 7A and 7B illustrate a second embodiment of the tandem-wheel unit 200C, in which the two wheels 230 are mounted on a rigid bar 213 and the rigid bar movably coupled to a single cam plate 212. The rigid bar 213 in this embodiment also serves as a rocker bar that allows the wheels to rock up and down as the ski travels over uneven ground. Mounting the cam plate on the kingpin 110 as shown places the wheels 230 equidistant from the kingpin 110, which maintains the desirable balance point on the ski. An actuating arm 420 from the deployment means 400 is coupled to the cam plate 212. When the deployment means forces this bar 213 to move in a first direction, the wheels 230 are brought to a deployed position, shown in FIG. 7B, and when forced to move in the opposite direction, the wheels 230 are brought to the stow position, shown in FIG. 7A. The cam plate 212 is shown coupled to a coupling mechanism 300 in FIGS. 7A-7B. This is done if two sets of tandem-wheel units are used, one on each side of the ski, to yoke them together. If only a single tandem-wheel unit is to be incorporated into the wheel-unit ready ski 1000, then the coupling assembly 300 is not needed and instead, the coupling means 218 on the cam plate 212 is coupled directly with the end of the actuating arm 420.

Figure 8C:
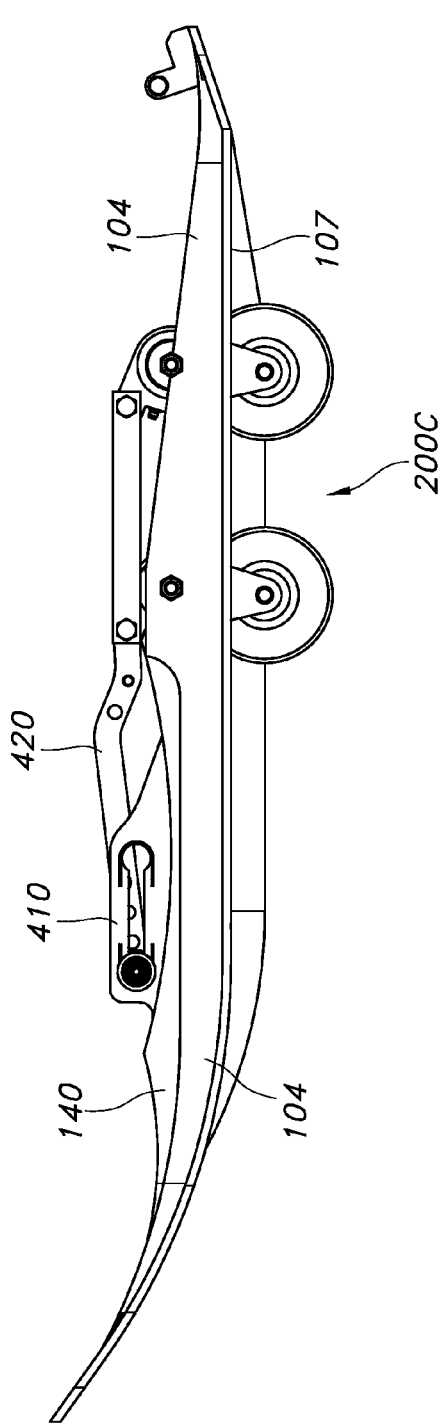
FIG. 8C shows an inside-mounted tandem-wheel unit, with the cam plate of one wheel mounted on the kingpin and the cam plate of the second wheel unit coupled to the first cam plate.
Figure 8D:
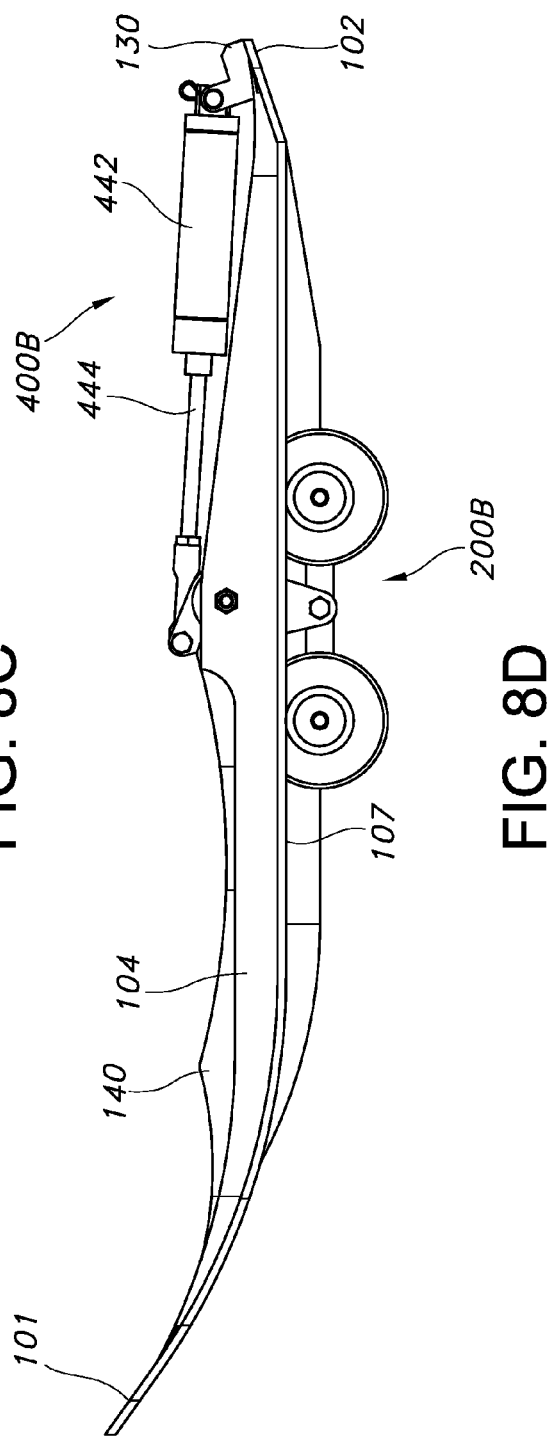
FIG. 8D illustrates a second tandem-wheel unit in the stowed position, both wheels mounted on a guide and the guide coupled to a cam plate that is mounted on the kingpin.

FIGS. 8A-8F illustrate various configurations of wheel mounts for the various embodiments of the wheel units. FIG. 8A shows the single-wheel wheel unit 200A mounted on the kingpin 110 on the wheel-unit ready ski 1000A. FIG. 8B illustrates an outside mounted tandem-wheel unit 200C, with the wheels deployed outside of the ski floor 107. FIG. 8C illustrates the wheel unit 200B, with one wheel 230 mounted on the kingpin 110 and the second wheel 230 coupled with the first wheel by a rigid bar. Whether the second wheel is in front of or behind the kingpin-mounted wheel is a design choice, depending on where the manufacturer prefers to have the wheel openings 120. Both embodiments are within the scope of the invention. FIG. 8D illustrates the tandem-wheel unit 200C mounted directly to the side wall 104, by means of a through-bore and insert. The sidewall 104 of the wheel-unit ready ski 1000 has a reinforced section 104B that includes the bore for the kingpin 110. This reinforced section 104A extends to each side from the kingpin. One or more bores 113 or other fastening means may be provided in this reinforced section 104B and a stub axle provided on the cam plate 212, for securing the cam plate to the side wall. FIG. 8E is a top plan view of the wheel-unit ready ski 1000, showing a plurality of bushings 219 and FIG. 8F a top plan view of an adapted cam plate 212, showing the stub shaft 220. This particular wheel-unit ready ski 1000 has been constructed to receive one or two wheel units 200 on one or both sides of the ski. Appropriately, the reinforced section 104B on this side of the ski is extended, to accommodate the additional inserts 219. The wheel unit 200 is mounted on the wheel-unit ready ski 1000 by assembling the stub shaft 220 in the bushing 219 and securing it. Many types of fastening means are suitable to secure the stub shaft to the insert, such as threaded fasteners, bolts, pins, etc. Also, in the embodiment shown, the bores 113 extend through the side wall. It is, of course, also possible for the bore 113 to extend only partially through the side wall. This figure also illustrates a ski body 100 in which the inner ribs 104C have been made thicker or reinforced, so that the bushings may be mounted in the inner ribs, if so desired, rather than in the reinforced section 104B.

Figure 9:
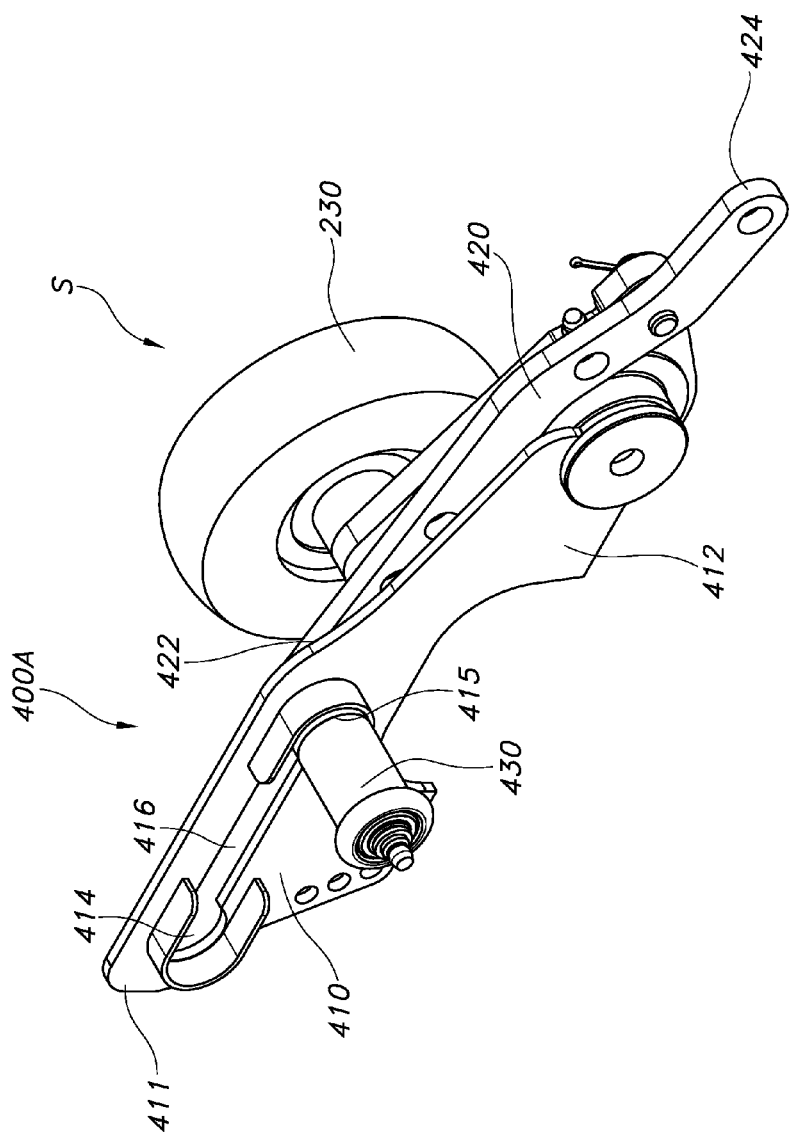
FIG. 9 is a perspective view of the manual deployment means.

The deployment means 400 according to the invention may be a manually actuated deployment means 400A, an automatically actuated deployment means 400B, or a semi-automatic deployment means 400C. FIGS. 9-9G illustrate the manually actuated deployment means 400A, which comprises a guide 410, an actuating or shift lever 420 that is coupled to the guide, and a handle or grip 430. In the embodiment shown, the guide 410 is a rail having a first end 411 and a second end 412 and a slot 416, but other embodiments of guides are within the scope of the invention. FIGS. 9 and 9B show a first lock position 414 and a second lock position 415 on the slot. The actuating lever 420 has a first end 422 that is attached to the handle 430 and a second end 424 that is coupled to the cam plate 212 at the coupling means 218, or, if two wheel units are yoked together, coupled to the coupler 300. In the embodiment shown, the handle 430 includes a spring-biased locking mechanism 432 that is captured in the slot 412 and holds the shift lever 420 locked into place at each of the locking positions 414 and 415. When the handle 430 is pulled out from the guide 410, the handle may then be slid along the slot 412 to move to the other position. FIG. 9 shows the handle 430 locked at the second lock position 415, thereby pulling the wheel unit 200 to a stowed position S, in which the wheel 230 is raised above the rolling surface. FIG. 9B shows the handle 430 locked at the first lock position 414, in which the shift lever 420 pushes the cam 212 to a deployed position D, to lower the wheel 230 to the ground, floor, or other support surface. FIG. 9E illustrates details of the locking handle 430. A coupling post 426 is provided on the shift lever 420, for coupling with the cam plate at 218.

The guide 410 of the deployment means 400A is shown in FIGS. 9-9B as a separate component that is mountable to the inner rib 140. A series of mounting bores 428 may be provided in the guide 410 for this purpose. It is understood, however, that the guide 410 may comprise a reinforced section that is integrated into the rib 140 when the wheel-unit ready ski 1000 is molded, may be a separate metal component that is fastened to the molded rib 140, or may be placed in the mold during the molding process, so as to embed the component in the rib 140.

Figure 10:
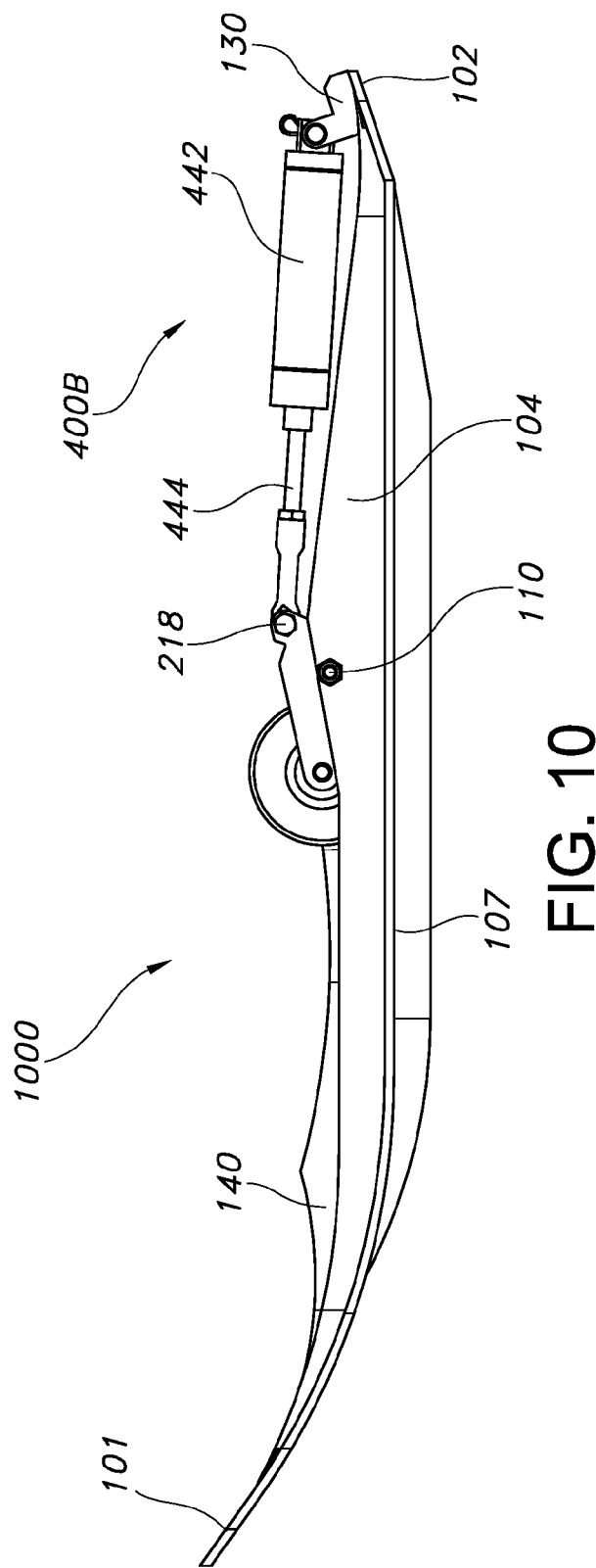
FIG. 10 illustrates the automatically actuated deployment means mounted in the wheel-unit ready ski.

FIG. 10 shows the automatically actuated deployment means 400B mounted in the wheel-unit ready ski 1000. In this embodiment, the deployment means is a fluid-driven, i.e., pneumatically or hydraulically operated, drive unit comprising a cylinder 442 and a rod 444. This type of actuator is well known in many industries. Thus, the details regarding the drive means for the deployment means are not shown. It is understood, that a switch is provided on the control panel of the vehicle, so that the operator may actuate the deployment means while seated on the vehicle. The fixed end of the cylinder 442 is anchored to the bracket 130 on the ski body 100 and the operative end of the rod 444 is linked to the coupler 300, if one is used, or, if only one wheel unit is used, to the cam plate coupling means 218, as shown. The automatically actuated deployment means 400B is shown anchored at the leading end of the wheel-unit ready ski 1000. It can just as well be anchored to the trailing end. This is a design choice of the ski manufacturer.

FIGS. 11A and 11B illustrate the semi-automatic deployment means 400C. A retraction spring 440, such as a helical coil spring, is schematically depicted and shown coupled to the shift lever 420, which is, in turn, coupled to the coupler 300 or the cam plate coupling means 218, as the case may be. The retraction spring 440 may also be a coiled, wind-up spring that is coupled directly to the cam plate 212. The various possible constructions of a biasing spring are well-known in the mechanical arts and these two types of retraction spring are provided as suggestions only. This spring biases the deployment means to move the wheel unit to the stowed position. Structurally, the semi-automatic deployment means 400C is similar in concept to the manual deployment means 400A, except that the retraction spring 440 snaps the actuating lever 420 back to the stowed position S, when weight is lifted from the ski. The particular construction of the first and second lock positions in the guide 410 to accommodate the locking handle 430 that is used for the manual deployment means 400A may be eliminated, because the weight of the ski holds the shift lever 420 in the deployed position and the biasing spring moves it to the stowed position. The user of the snowmobile must intentionally shift a knob or handle 421 captured in slot 412 from the stowed position 415 to the deployed position 414, in order to deploy the wheels 230. As soon as the snowmobile travels back onto snow, weight is lifted from the ski and the retraction spring 440 pulls the shift lever 420 back to the stowed position 415.

The wheel unit 200 is shown in the previously discussed figures mounted on the kingpin 110 or on the side wall 104 near the kingpin. As mentioned above, mounting the wheel unit 200 on or balanced about the kingpin 110 is desirable, because the ski 1000 is balanced about that axis. It is also possible, however, to mount the wheel unit 200 indirectly to the kingpin 110 by mounting it directly on the steering spindle that is coupled with the kingpin, as described below.

Figure 12B:
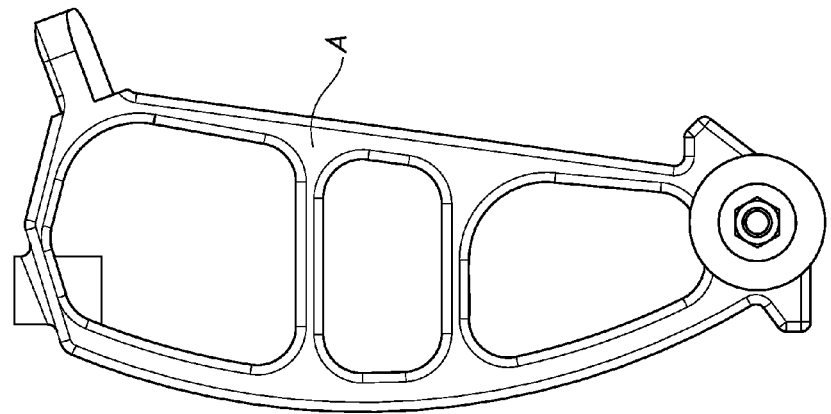
FIG. 12B is a side elevation view of the conventional snowmobile steering spindle of FIG. 12A. (prior art)
Figure 12A:
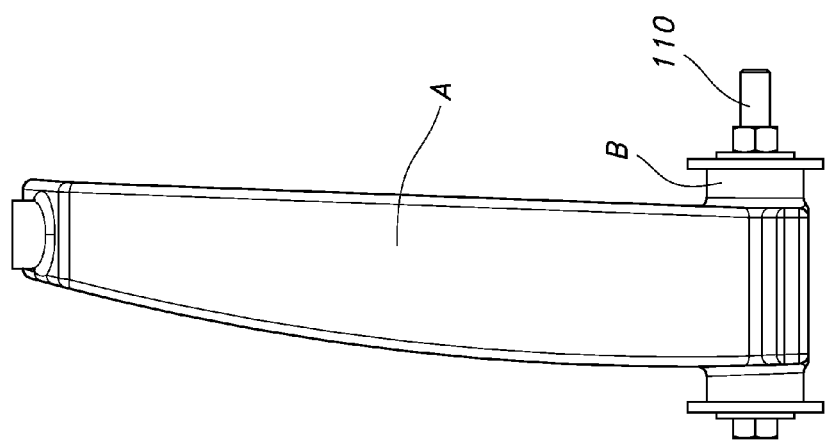
FIG. 12A is a rear elevation view of a conventional snowmobile steering spindle. (prior art)

FIG. 12A is a front elevation view and FIG. 12B a side elevation view of a conventional steering spindle, which is mounted on the A-arms or stabilizing arms of the vehicle. The A-arms are not shown, because mounting the steering spindle on the stabilizing arms is conventional practice and well understood. The steering spindle has a spindle body A and a boss B that provides a through-bore for the kingpin 110. A bushing is conventionally inserted through the through-bores to reinforce the support for the kingpin 110 and a washer and nut are used to secure the kingpin 110 to the spindle body A. The kingpin extends on both ends through the side walls of the ski. These figures show the conventional snowmobile steering spindle with the kingpin through the boss B. The side wall 104 of the wheel-unit ready ski 1000 is indicated with dashed lines.

FIGS. 13-17 show various embodiments of a steering spindle 500 according to the invention that has been adapted to be couplable with any of the wheel units 200 and deployment means 400 described above. The lower end of the spindle body 510 has a first extension 512 that typically faces the trailing end of the ski and a second extension 514 that faces the leading edge.

FIGS. 13 and 14 illustrate a first adaptation of the steering spindle 500 according to the invention, showing the guide 410 of the deployment means 400A or 400B extending from the first extension 512. The actuating lever 420 is then couplable with the guide 410 and the wheel unit 200, as described above. A bracket 520 is provided on the first extension 512 that serves to anchor the guide 410 to the steering spindle. Also shown are two wheel units 200, without the wheels 230 attached, mounted on the spindle bosses B. The bracket 520 may be a separate component that is attached to the steering spindle, as needed, or incorporated into the casting of the spindle. If the bracket is a separate component, the spindle body 510 may have a threaded bore or other fastening means to receive and securely fasten the bracket 520 to the body 510. In this embodiment, the bracket 520 has at least one eye or reinforced through-bore that extends from the spindle body 510 so as to enable a fastening rod that extends from the first end 411 of the guide 410 to be securely fastened to the steering spindle. The fastening means shown in these two figures is simply illustrative of one manner of affixing the guide 410 to the spindle body 510. Other suitable fastening means may be used, such as a female threaded fastener in the spindle body and a male threaded fastener on the guide or vice versa. It is also within the scope of the invention to integrate the guide 410 into the casting for the steering spindle 500.

Figure 15:
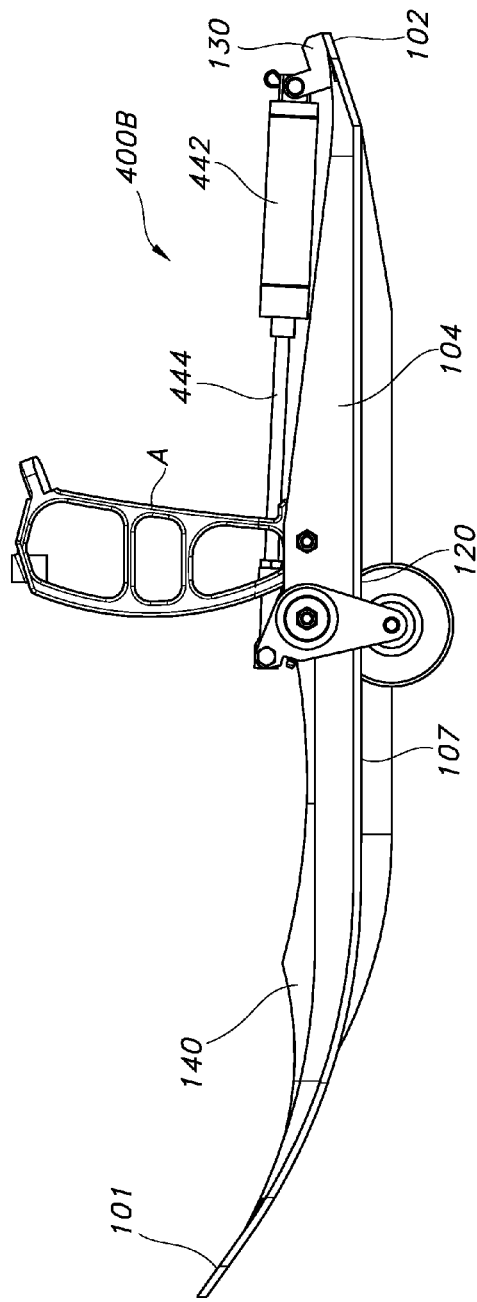
FIG. 15 illustrates the automatic deployment means anchored at the trailing end of the ski, with the rod of the automatic deployment means extending through a through-hole in the steering spindle and coupled with the cam plate of a wheel unit.
Figure 16:
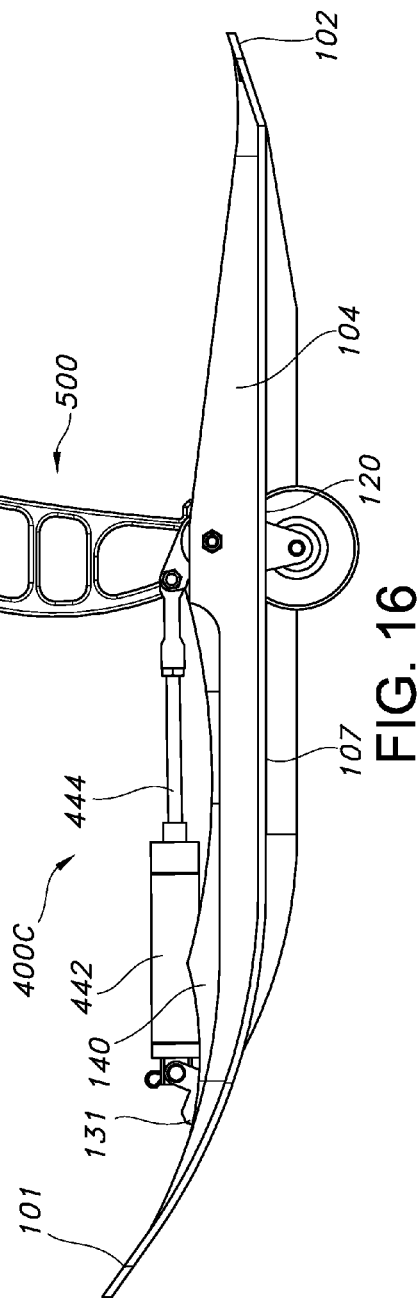
FIG. 16 illustrates the automatic deployment means anchored at the leading end of the ski, with the rod coupled to the cam plate of a wheel unit.

FIG. 15-18 illustrate various configurations of the steering spindle 500 and the automatic deployment means 400B. FIG. 15 shows the steering spindle 500 and the automatic deployment means 400B mounted such, that the cylinder 442 is mounted on a first side of the steering spindle 500 and the connecting point on the cam plate 216 on the other side. A through-bore through the lower portion of the steering spindle 500 allows the piston rod 444 to extend through the bore and be coupled with the cam plate 212, so as to move the cam plate 212 between the stowed and deployed positions. If only a single wheel unit is mounted on the wheel-unit ready ski, an offset may be provided on the end of the rod to connect to the cam plate. FIG. 16 illustrates the piston connected coupled to the cam plate, whereby the wheel unit may be mounted on the spindle or the kingpin. The piston 444 may have an offset to allow the piston to connect to a wheel unit that is mounted on one side only of the wheel-unit ready ski 1000.

Figure 17:
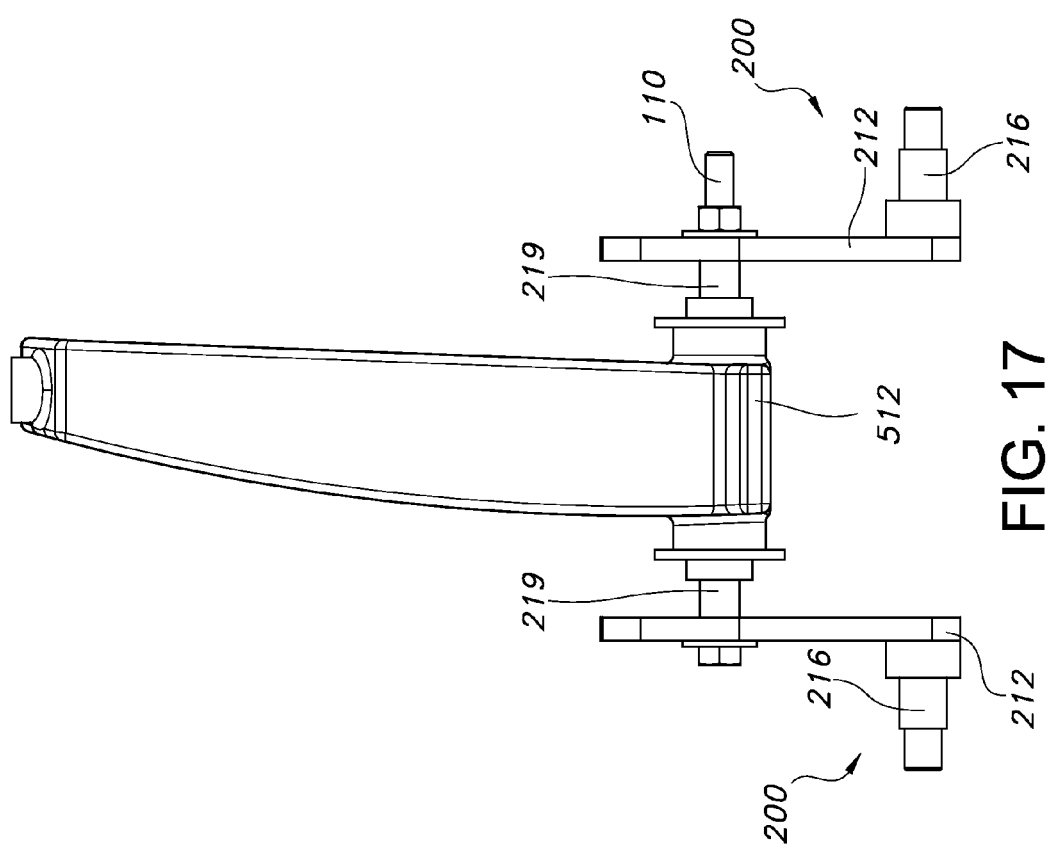
FIG. 17 illustrates the wheel unit mounted on an extended spindle bushing.

It is also within the scope of the invention to adapt the boss B and/or a bushing 219 to accommodate the wheel-mounting means 210. FIG. 17 illustrates a bushing 219 that has been extended out beyond the boss and the wheel unit 200 mounted on the bushing 219 and FIG. 18 shows the piston rod 444 connected to the cam plate 212. In this embodiment, the bushing has been extended out on both ends of the kingpin 110. It is understood that, depending on the particular embodiment of the wheel-unit ready ski, the bushing or the boss may be extended out to one side only. The scope of the invention is not limited to using the boss or the bushing, but rather, the wheel mounting means 210 may be adapted to be otherwise mounted on the steering spindle 500 in a way that allows the wheels to be moved between the deployed and stowed positions.

Figure 20:
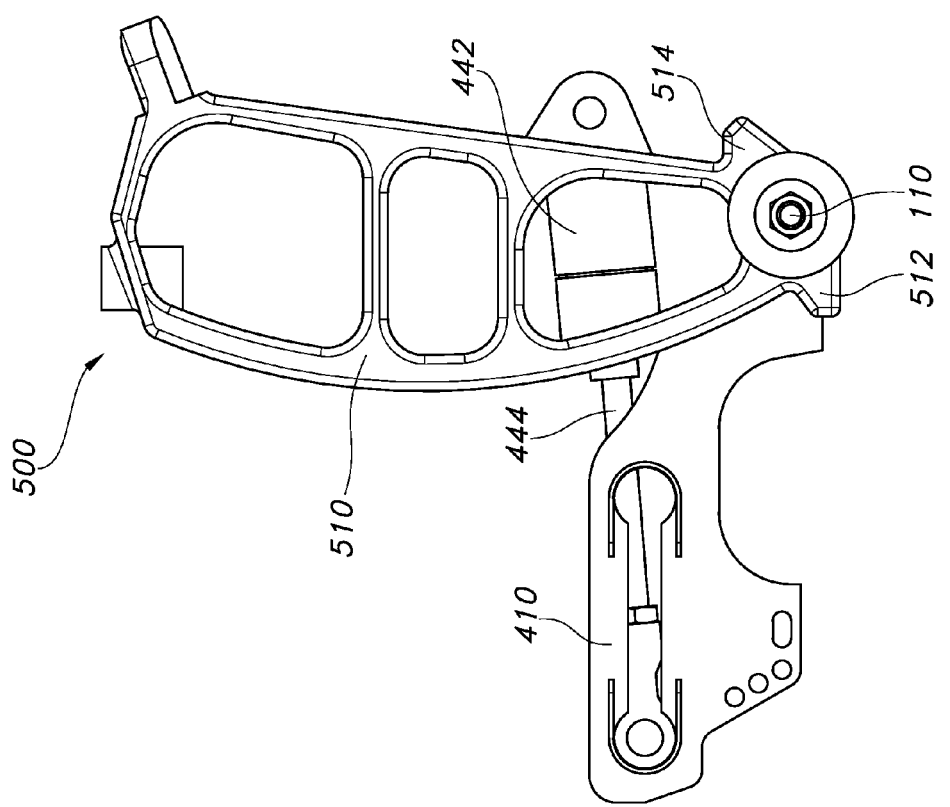
FIG. 20 illustrates a cylinder incorporated into the spindle body of the steering spindle.

FIG. 20 illustrates a combination of the steering spindle 500, the automated deployment means 400, and the guide 420 that is integrated into the spindle. The cylinder 442 in this embodiment is mounted in the spindle body 510. The spindle 500 and the cylinder 442 may have mating threads as a fastening means. The cylinder 442 may also be integrated into the casting of the spindle body 510. This embodiment shows the distal end of the piston 442 captured in the guide 410. It may be desirable to use the guide, rather than coupling the rod 442 directly with the cam plate 212, as shown in other figures.

Various configurations of mounting the wheel unit 200 on a ski so that it is balanced about the balance point of the kingpin 110 have been shown discussed. The wheel unit has been shown mounted on a kingpin, on a steering spindle, on a side wall. Other suggested locations are on the side wall of a saddle 150. In other words, the wheel unit 200 does not have to be mounted on the kingpin 110 or the steering spindle 500. Depending on the design of the particular ski 1000 and the configuration of wheel unit 200 and deployment unit 400, the wheel unit and deployment unit may be mounted some distance away from the kingpin 110, in a manner that does not disturb the balance of the ski 1000. A counterweight may also be incorporated into the ski body 100 of the wheel-unit ready ski to maintain the desired balance.

It is within the scope of the invention that a manufacturer provide wheel openings 120 for a specific configuration of one or more wheel units 200 for a particular snowmobile or vehicle. Thus, the wheel-unit ready ski 1000 may be molded with one or more openings 120 on one side of the ski only, or on both sides. The opening(s) may be dimensioned to accommodate the tandem-wheel unit 200B/200C or only a single-wheel unit 200A.

Different brands of ski-mounted vehicles may have special design and structural features that would restrict the type of wheel unit 200 that can be incorporated into the ski 1000. It is within the scope of this invention to allow a ski manufacturer to configure the wheel-unit ready ski 1000 to accommodate these special features. For example, if a manufacturer of a particular brand of snowmobile believes that two one-wheel units would be appropriate for the particular snowmobile, the ski may be molded with the guide 410 incorporated into one of the ribs 104 and two wheel openings 120 in the ski floor 107, each wheel opening dimensioned to receive a single wheel. The manufacturer of a different type or brand of snowmobile or ski-mounted vehicle may recommend that dual tandem-wheel units and the automatic deployment means 400B be used and may then have the wheel-unit ready ski 1000 constructed accordingly. In this case, the appropriate apertures 120 are provided in the floor 107 and the bracket 130 for the cylinder incorporated into the ski mold.

FIG. 19 illustrates a first embodiment of a snow guard 600, to prevent snow from flying upward. This first embodiment is a fender 600A that partially covers the wheel unit. The shape of the fender 600 may be constructed to accommodate all types of wheel units described herein, or, as a design choice, the manufacturer may decide to shape the fender to cover a specific embodiment of the wheel-unit ready ski with wheel unit. In the embodiment shown, the fender 600 is constructed to cover an inside mounted wheel unit 200A. The fender may be an integral part of the mold for the ski body, or may be a snap-on component that fits over the wheel unit 200. A person of skill in the art will understand how to form a fender, whether it be intended to cover an outside- or inside-mounted wheel unit.

FIG. 21 illustrates a second embodiment of the snow guard 600 that is a flexible shield 600B that extends over the wheel opening 120 and allows the wheel 230 to pass through the shield 600B. When the wheel unit 200 is in its stowed position, the shield 600B covers the opening and, when in its deployed position, the shield closes around the wheel unit, effectively covering the open portion of the wheel opening 120. Examples of suitable embodiments for the shield 600B include a brush with resilient bristles and a split flexible rubber boot.

It is understood that the embodiments described herein are merely illustrative of the present invention. Variations in the construction of the ski, ski spindle, and wheel units may be contemplated by one skilled in the art without limiting the intended scope of the invention herein disclosed and as defined by the following claims.

What is claimed is:
1. A ski for a vehicle, the ski comprising:
a ski body having a leading end and a trailing end and a longitudinal axis that extends from the leading end to the trailing end, a floor, an underside of which is a glide surface, and two side walls; and wherein the ski body is adapted to receive a wheel unit, the floor of the ski body having one or more wheel openings for allowing one or more wheels on the wheel unit to move between a stowed position, in which the wheel is raised above the glide surface, and a deployed position, in which the wheel is lowered into the wheel opening to a depth lower than the glide surface; and wherein the side walls have a reinforced section for receiving a king pin and wherein the one or more wheel openings are provided in a section of the floor that is near the reinforced section of the side walls.

2. The ski of claim 1, wherein the one or more wheel openings include a first and second wheel opening and the two side walls include a first side wall and a second side wall, each wheel opening provided inside the respective first and second side walls, and wherein a portion of each wheel opening is situated beneath the reinforced section of the respective first and second side walls.

3. The ski of claim 2, wherein the one or more wheel openings further include a third and fourth wheel opening, the third wheel opening aligned in a longitudinal direction with the first wheel opening and the fourth wheel opening similarly aligned with the second wheel opening, so as to accommodate a wheel unit in each of the four wheel openings.

4. The ski of claim 1, the ski body having a widening of the ski floor at least in an area of the reinforced section of the side walls.

5. The ski of claim 1, wherein the one or more wheel openings include at least a first wheel opening and a second wheel opening, the first wheel opening provided in the ski floor outside a first side wall and the second wheel opening provided in the ski floor outside the second side wall.

6. The ski of claim 5, wherein the one or more wheel openings further include a third wheel opening and a fourth wheel opening, the third wheel opening aligned in a longitudinal direction with the first wheel opening and the fourth wheel opening similarly aligned with the second wheel opening.

7. A ski for a vehicle, the ski comprising:
a ski body having a leading end and a trailing end and a longitudinal axis that extends from the leading end to the trailing end, a floor, an underside of which is a glide surface, and two side walls; and wherein the ski body is adapted to receive a wheel unit, the floor of the ski body having one or more wheel openings for allowing one or more wheels on the wheel unit to move between a stowed position, in which the wheel is raised above the glide surface, and a deployed position, in which the wheel is lowered into the wheel opening to a depth lower than the glide surface;

wherein a saddle is provided on the ski body; and wherein one of the one or more wheel openings is provided on at least one side of the saddle.

8. The ski of claim 7, wherein the saddle is a U-shaped channel having two saddle side walls that are adapted to receive the wheel unit.

9. The ski of claim 8, wherein the saddle side walls replace a portion of the side walls of the ski body.

10. The ski of claim 7, wherein the saddle is an L-shaped channel with one saddle side wall that is adapted to receive the wheel unit.

11. The ski of claim 10, wherein the saddle side wall replaces a portion of one of the side walls on the ski body.

12. A ski for a vehicle, the ski comprising:
a ski body having a leading end and a trailing end and a longitudinal axis that extends from the leading end to the trailing end, a floor, an underside of which is a glide surface, two side walls, and an inner rib; and wherein the ski body is adapted to receive a wheel unit, the floor of the ski body having one or more wheel openings for allowing one or more wheels on the wheel unit to move between a stowed position, in which the wheel is raised above the glide surface, and a deployed position, in which the wheel is lowered into the wheel opening to a depth lower than the glide surface; and wherein the inner rib has a reinforced section and the wheel assembly is mountable on the reinforced section.

13. A wheel-and-ski system for a ski-mounted vehicle having a ski, a steering spindle, and a kingpin to couple the steering spindle to the ski, the system comprising:
a ski that comprises a ski body having a leading end and a trailing end and a longitudinal axis that extends from the leading end to the trailing end, a floor, the underside of which is a glide surface, and two side walls;
a wheel unit that is mounted inside the side walls of the ski body, the wheel unit including a wheel assembly and a deployment means to move the wheel assembly between a deployed position and a stowed position;
wherein the wheel unit is coupled to the steering spindle.

14. The system of claim 13, wherein the wheel assembly is suspended from the kingpin and the deployment means is coupled to the steering spindle.

15. The system of claim 13, wherein the steering spindle has a through-bore for receiving the kingpin with a boss at each end of the through-bore and the wheel assembly is suspended from the boss.

16. The system of claim 13, wherein the steering spindle has a through-bore for receiving the kingpin, with a bushing at each end of the through-bore, and the wheel assembly is suspended from or one or both bushings.

17. The system of claim 14, wherein the deployment means is a manual deployment means having a deployment rail, an actuation arm that is coupled at a first end to the wheel assembly, and a capture means in the deployment rail for selectively holding a second end of the actuation arm in a deployed position and in a stowed position;
wherein the deployment rail is mounted on the steering spindle.

18. The system of claim 17, wherein the deployment rail is an integral part of the steering spindle.

19. The system of claim 14, wherein the deployment means is an automated deployment means that includes a rod as an actuation arm that is coupled to the wheel unit and a cylinder that actuates the rod, and wherein the cylinder means is mounted on the ski body.

20. The system of claim 19, wherein the cylinder is mounted on the steering spindle.

21. The system of claim 19, wherein the cylinder is an integral part of the steering spindle.

22. The system of claim 14, wherein the deployment means is a semi-automated device that includes a deployment rail, an actuation arm that is coupled at a first end to the wheel assembly, and a capture means in the deployment rail for selectively holding a second end of the actuation arm in a deployed position and in a stowed position, wherein a biasing spring in the actuation arm biases the deployment means to a stowed position, such that, when weight is lifted from the ski, the wheel assembly automatically shifts to the stowed position.

23. The system of claim 22, wherein the deployment rail is mounted on the ski body.

24. The system of claim 22, wherein the deployment rail is an integral part of the molded ski body.

25. The system of claim 22, wherein the deployment rail is mounted on the steering spindle.

26. The system of claim 14, wherein the ski body includes a saddle, and wherein the deployment means is mounted on a sidewall of the saddle.

27. The system of claim 26, wherein the deployment means is an integral part of the saddle.

28. The system of claim 13, wherein the wheel assembly is mounted on a side wall of the ski body.

29. The system of claim 13, wherein the wheel assembly is a dual-wheel assembly having a first wheel assembly for assembling on a first side of the ski and a second wheel assembly for assembling on a second side of the ski.

30. The system of claim 29, wherein the first wheel assembly and second wheel assembly are ganged together with a coupling mechanism, so as to be actuatable by a single deployment means.

31. The system of claim 30, wherein the dual-wheel assembly includes a pair of tandem wheels that are aligned one behind the other and are ganged together so as to be actuatable by a single deployments means.

32. The system of claim 13, wherein the ski is adapted to receive the wheel unit, the floor of the ski body having one or more wheel openings for allowing one or more wheels of the wheel assembly to move between a stowed position, in which the wheel is raised above the glide surface, and a deployed position, in which the wheel is lowered into the wheel opening to a depth lower than the glide surface.

33. The system of claim 32, wherein the ski body has a middle section that includes a reinforced section in the sidewalls for receiving the kingpin, and wherein the floor has a wheel opening the middle section.

34. The system of claim 33, wherein the wheel assembly is mounted in the middle section such that the wheel is deployable through the wheel opening.

35. The system of claim 33, wherein the wheel opening in the middle section is outside of the sidewall.

36. The system of claim 33, wherein at least the middle section is widened to accommodate the wheel opening in the floor outside of the sidewall.

\* \* \* \* \*